United States Patent
Gee

(10) Patent No.: US 6,669,637 B2
(45) Date of Patent: Dec. 30, 2003

(54) PARAMETRIC TRANSMIT WAVEFORM GENERATOR FOR MEDICAL ULTRASOUND IMAGING SYSTEM

(75) Inventor: Albert Gee, Los Altos, CA (US)

(73) Assignee: Acuson Corporation, Mountain View, CA (US)

( * ) Notice: Subject to any disclaimer, the term of this patent is extended or adjusted under 35 U.S.C. 154(b) by 0 days.

(21) Appl. No.: 10/337,164

(22) Filed: Jan. 6, 2003

(65) Prior Publication Data

US 2003/0125627 A1 Jul. 3, 2003

Related U.S. Application Data

(62) Division of application No. 09/690,671, filed on Oct. 17, 2000, now Pat. No. 6,551,244.

(51) Int. Cl.$^7$ .................................................. A61B 8/00
(52) U.S. Cl. ..................................................... 600/437
(58) Field of Search ................................ 600/437, 438, 600/440–447, 449, 450, 451–471; 367/7, 11, 130, 138, 140–181; 73/625, 626, 602, 628; 128/916; 348/581, 723, 588

(56) References Cited

U.S. PATENT DOCUMENTS

| | | | |
|---|---|---|---|
| 5,092,337 A | | 3/1992 | Uchiumi et al. |
| 5,549,111 A | | 8/1996 | Wright et al. |
| 5,581,517 A | | 12/1996 | Gee et al. |
| 5,608,690 A | * | 3/1997 | Hossack et al. ............. 367/138 |
| 5,675,554 A | | 10/1997 | Cole et al. |
| 5,833,614 A | * | 11/1998 | Dodd et al. .................. 600/447 |
| 5,980,457 A | * | 11/1999 | Averkiou ..................... 600/437 |
| 5,995,450 A | * | 11/1999 | Cole et al. ................... 367/138 |
| 6,340,346 B1 | * | 1/2002 | Almog et al. ................ 600/300 |

* cited by examiner

*Primary Examiner*—Ali M. Imam

(57) ABSTRACT

A medical diagnostic ultrasonic imaging system includes a transmit waveform generator that uses stored parameters to completely define an arbitrarily complex transmit waveform. Preferably, the stored parameters define an envelope function and a modulation function in a piecewise fashion using a number of sets of quadratic parameters. These quadratic parameters are used to calculate the desired envelope function and modulation function in the log domain, and the envelope and modulation functions are combined in the log domain and then converted to the linear domain. Multiple separate transmit waveforms may be combined in a single channel, and individual channels may be combined prior to application to the transducer elements.

21 Claims, 23 Drawing Sheets

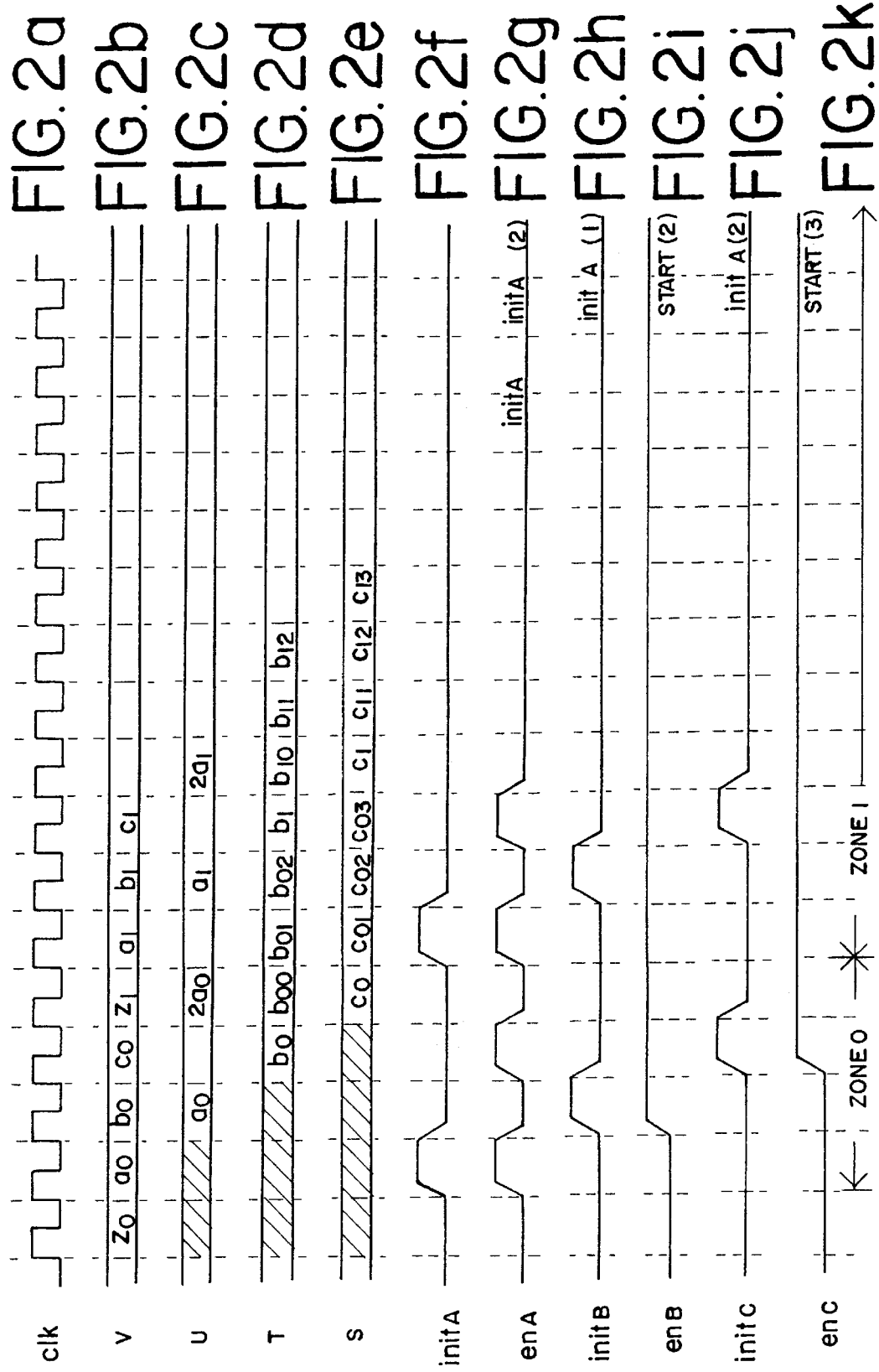

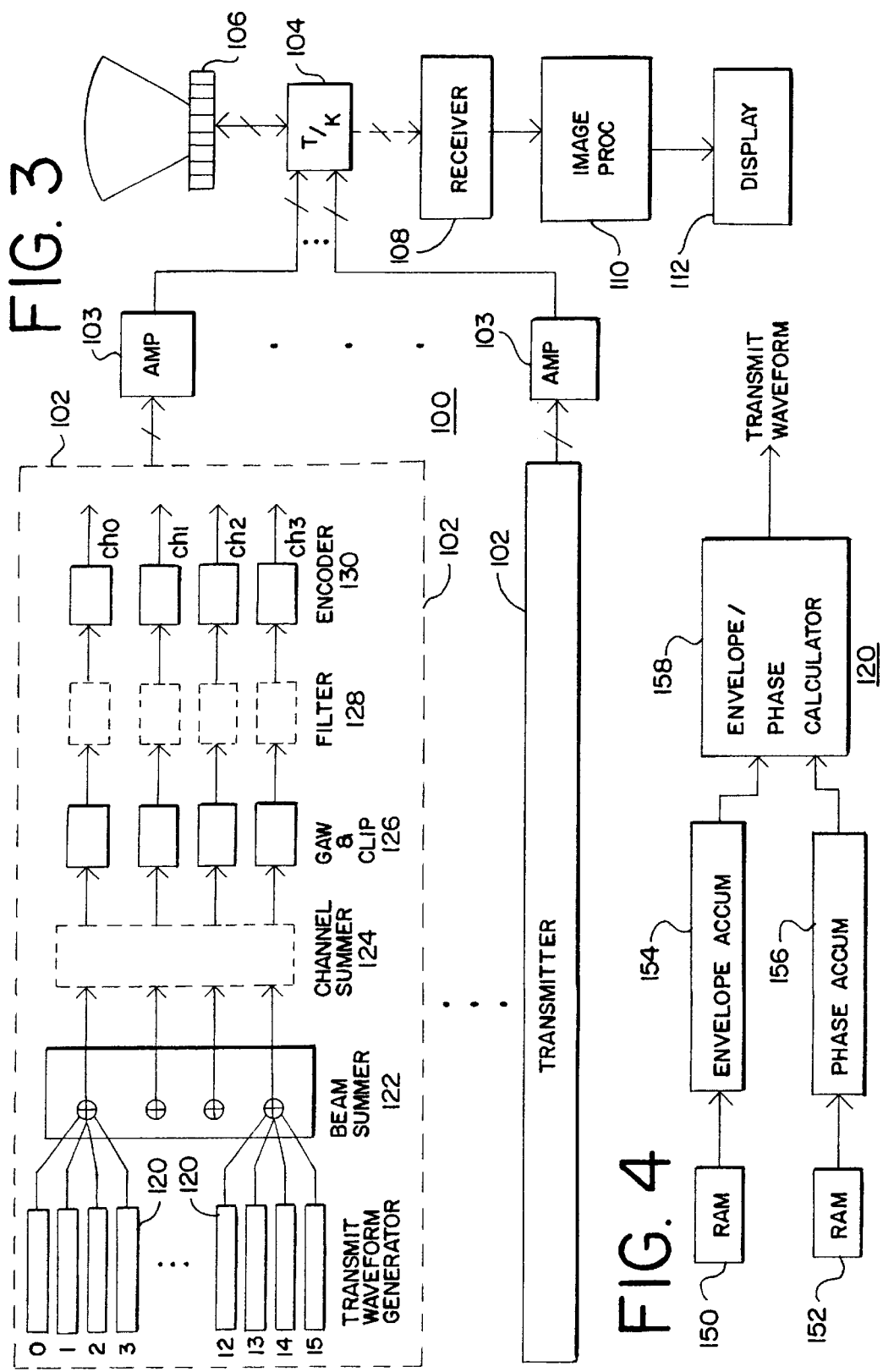

COS PARAMETERIZED ENVELOPE,
COEFS=(0.540000 0.460000 0.000000 0.000000)

COS PARAMETERIZED ENVELOPE,
COEFS=(0.540000 0.460000 0.000000 0.000000)

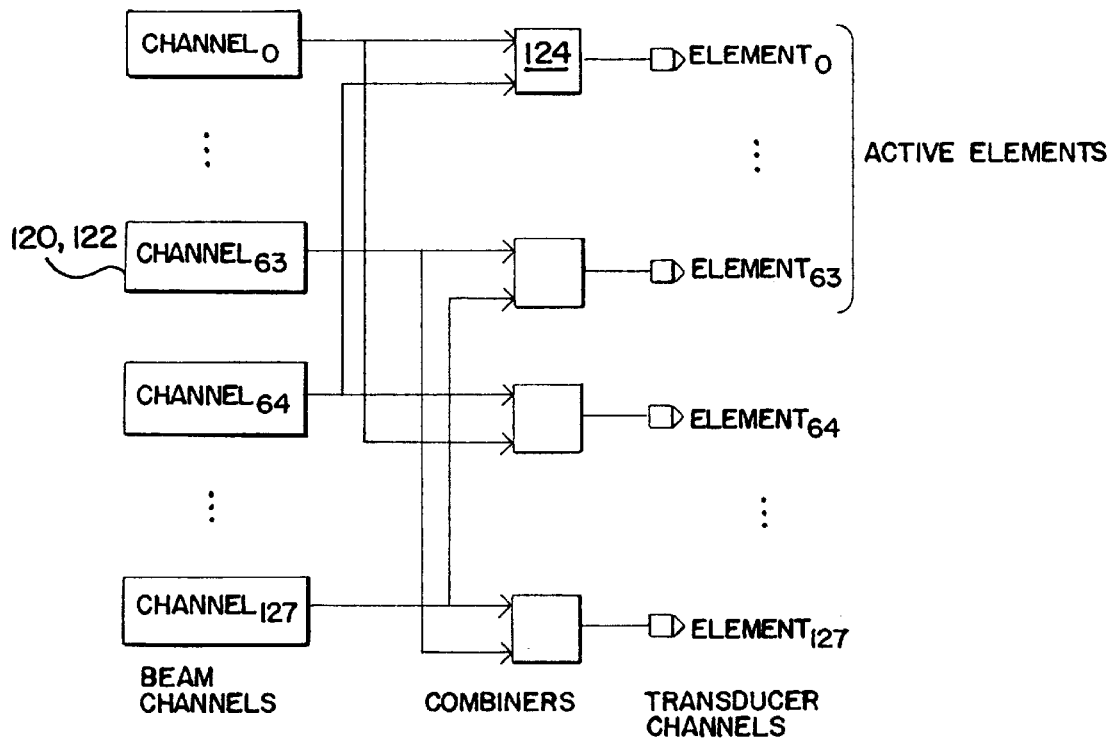
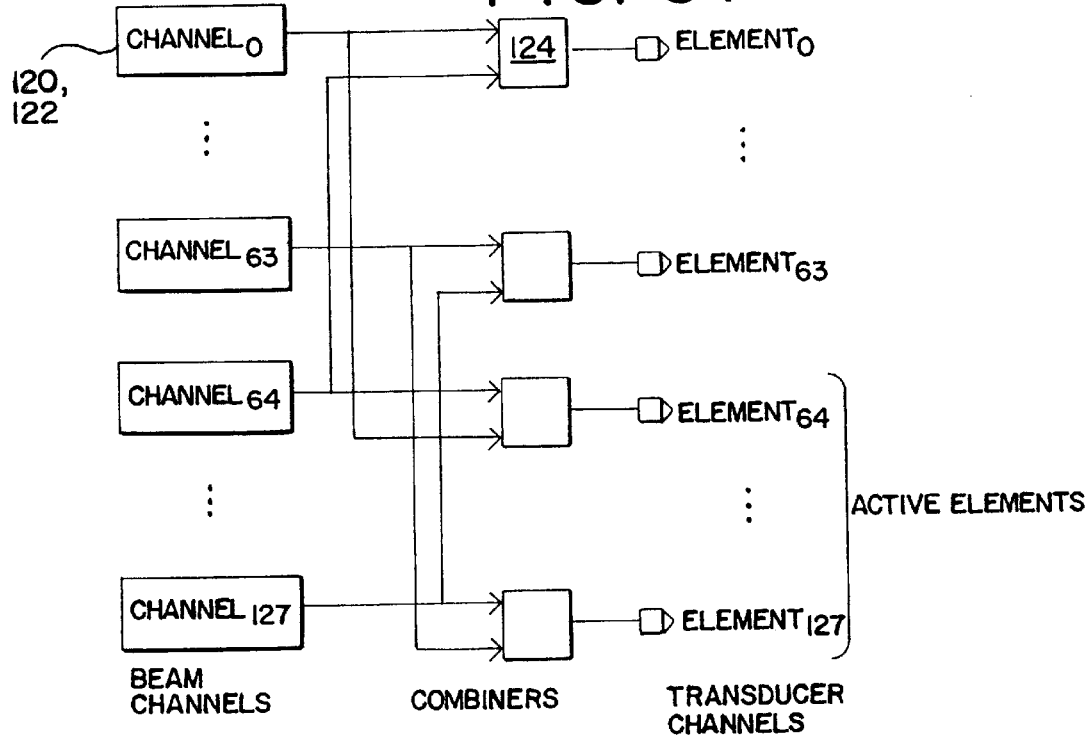

PARAMETRIC TRANSMIT WAVEFORM GENERATOR FOR MEDICAL ULTRASOUND IMAGING SYSTEM

This application is a division of application Ser. No. 09/690,671, U.S. Pat No. 6,551,244 filed Oct. 17, 2000, (pending), which is hereby incorporated by reference herein.

BACKGROUND

The present invention relates to medical diagnostic ultrasonic imaging systems, and in particular to digital transmit waveform generators adapted for such systems.

In the prior art, digital transmit beamformers are known that use a memory such as a RAM to store a sampled version of the desired transmit waveform envelope. The data stored in RAM can be a complex baseband envelope sampled at the Nyquist frequency. See Cole, U.S. Pat. No. 5,675,554, assigned to the assignee of this invention. In this case, signal processing techniques are then used to interpolate, filter, and modulate the envelope to form the desired ultrasonic transmit waveform. In some cases, multiple simultaneous transmit beams are generated in real time in a time-interleaved manner. See the above-identified Cole patent. As another alternative, the desired ultrasonic transmit waveform can be stored directly in RAM.

The methods described above require a memory size that increases linearly with the time duration of the transmit waveform. For long transmit waveforms such as coded excitation transmit pulses, the number of samples stored in memory can exceed currently available RAM sizes. For a given RAM size, the number of samples required for each transmit waveform limits the number of concurrent RAM transmit waveforms. In some cases, this can limit the number of distinct transmit waveforms per beam, or may require reloading the RAM on a line-by-line basis, which may adversely affect the frame rate.

The process of interpolating, filtering and modulating a Nyquist-sampled baseband signal can in some cases limit the final bandwidth and frequency of the ultrasonic transmit waveform. In addition, interpolating and filtering a Nyquist-sampled signal can result in spurious signals due to non-ideal filtering. This effect is especially apparent when the carrier frequency is verniered from the center of the filter pass band.

Time interleaving multiple transmit beams is hardware efficient, but it utilizes a tradeoff between the number of transmit beams, the bandwidth, and/or the center frequency. In some implementations at the highest center frequency and the highest permitted bandwidth only a single transmit beam is allowed per channel.

SUMMARY

By way of introduction, the preferred embodiment described below calculates ultrasonic transmit waveforms by storing a set of parameters that defines both an envelope function and a modulation function for the desired ultrasonic transmit waveform, and then calculating the ultrasonic transmit waveform in real time based on the set of parameters. The envelope function is preferably a smoothly rising and falling function, such as a Gaussian function.

In this embodiment the parameters entirely define the ultrasonic transmit waveform, and for this reason the stored parameters efficiently use system memory, even for transmit waveforms of long duration.

The preferred transmit waveform generator comprises a transmit waveform calculator that calculates the waveforms in the log domain, thereby minimizing the need for multipliers. Preferably, the waveform calculator comprises a plurality of accumulators that are operative to form respective quadratic functions in real time. These quadratic functions define the respective ultrasonic transmit waveform functions in the log or linear domain.

The disclosed embodiment combines multiple transmit waveforms using combiners that comprise of plurality of inputs and outputs, and multiplexers that switch transmit waveforms from respective single or combined transmit waveform generators to desired transducer channels.

This section is intended as a brief introduction, and it is not intended to limit the scope of the following claims.

BRIEF DESCRIPTION OF THE DRAWINGS

FIGS. 2a–2k are timing diagrams used in describing the operation of the accumulator of FIG. 1.

FIG. 3 is a block diagram of a medical diagnostic ultrasonic imaging system that incorporates a preferred embodiment of this invention.

FIG. 4 is a block diagram of one of the transmit waveform generators 120 of FIG. 3.

FIGS. 34–37 are block diagrams of single-channel (FIG. 34) and multi-channel (FIGS. 35–37) configurations for the transmitters 102.

FIG. 35 shows 128 transmit processing channels applied to a 64 element transducer, and FIGS. 36, 37 show 128 transmit processing channels applied to any contiguous block of 64 elements of a 128 element transducer.

DETAILED DESCRIPTION OF THE PREFERRED EMBODIMENTS

General Discussion

Figure 1:
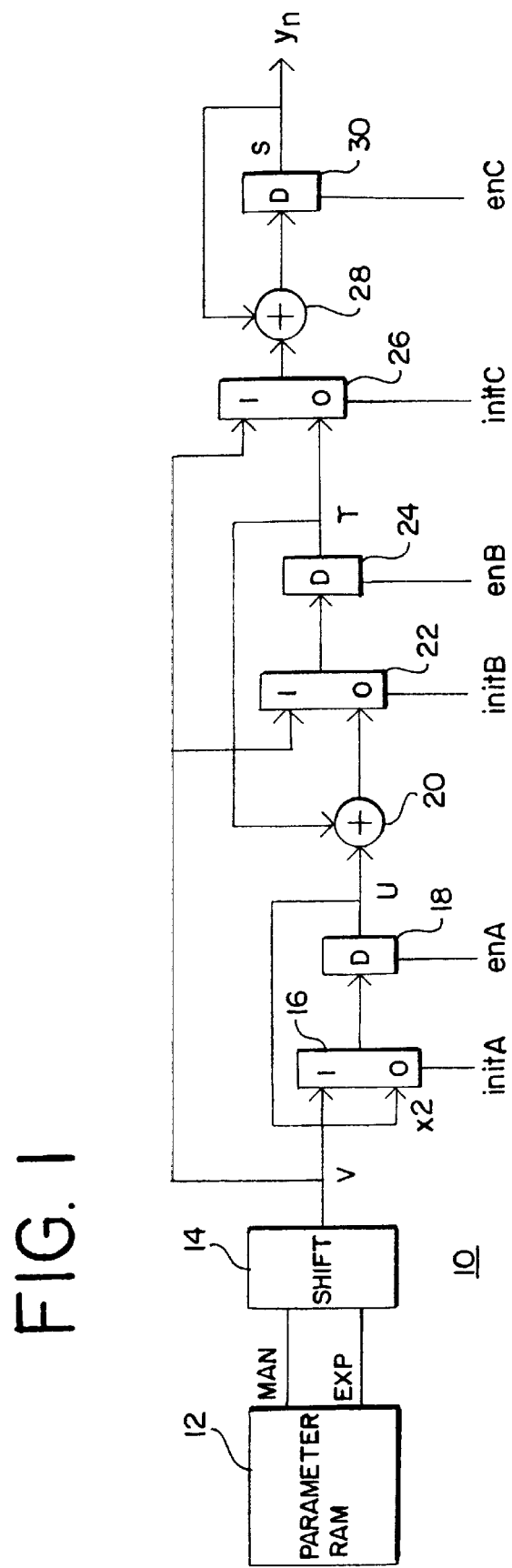
FIG. 1 is a generalized block diagram of an accumulator of the type used in the preferred embodiment of this invention.

The specific examples described below generate ultrasonic transmit waveforms efficiently by calculating quadratic functions that define the envelope and the modulation function of the waveform. These quadratic functions are then combined, converted to the linear domain where appropriate, and used to drive respective transducer elements. The following discussion presents the basic mathematical framework of the approach implemented in the example of FIGS. 3–13.

A Gaussian ultrasonic transmit waveform x(t) can be expressed as follows:

$$x(t) = \text{Re}\left\{Ae^{-\pi(1-i\rho)\left(\frac{t-\tau}{T_c}\right)^2}e^{i2\pi f_c(t-\tau)}\right\} = \quad \text{(Eq. 1)}$$

$$Ae^{-\pi\left(\frac{t-\tau}{T_c}\right)^2}\cos\left(2\pi f_c(t-\tau) + \pi\rho\left(\frac{t-\tau}{T_c}\right)^2\right)$$

where

A=gain,
ρ=time-bandwidth product,
$T_c$=Gaussian pulse duration,
$f_c$=carrier frequency,
τ=pulse delay.

y(t), the logarithm (base 2) of the ultrasonic waveform x(t), is therefore:

$$y(t)=\log_2(x(t))=g(t)+\log_2(\cos(2\pi\theta(t))), \quad \text{(Eq. 2)}$$

and $$x(t)=2^{y(t)}\Delta.$$

In Eq. 2, the function g(t) may be sampled at discrete times $n\Delta_t$, where $\Delta_t$ is the interval between samples and n is the sample number. In addition, τ may be quantized to $\Delta_t$ resolution such that τ is equal to $n_{96} \cdot \Delta_t$. With these conventions $g_n$ is equal to g(t) at time $n\Delta_t$, and $g_n$ can be expressed as follows:

$$g_n = g(n\Delta_t) = \quad \text{(Eq. 3.)}$$

$$\log_2(A) - \pi\log_2(e)\left(\frac{n\Delta_t - (n_\tau * \Delta_t)}{T_c}\right)^2 = a_0 n^2 + b_0 n + c_0,$$

where $$a_0 = -\pi\log_2(e)\left(\frac{\Delta_t}{T_c}\right)^2, \quad \text{(Eq. 4)}$$

$$b_0 = 2\pi\log_2(e)\left(\frac{\Delta_t}{T_c}\right)^2 n_\tau, \quad \text{(Eq. 5)}$$

$$c_0 = \log_2(A) - \pi\log_2(e)\left(\frac{\Delta_t}{T_c}\right)^2 n_\tau^2. \quad \text{(Eq. 6)}$$

Similarly, the function θ(t) of Eq. 2 when sampled at discrete times $n\Delta_t$ may be expressed as follows:

$$\theta_n = \theta(n\Delta_t) = \quad \text{(Eq. 7)}$$

$$f_c(n\Delta_t - (n_\tau * \Delta_t)) + \frac{\rho}{2}\left(\frac{n\Delta_t - (n_\tau * \Delta_t)}{T_c}\right)^2 = a_1 n^2 + b_1 n + c_1,$$

where $$a_1 = \frac{\rho}{2}\left(\frac{\Delta_t}{T_c}\right)^2, \quad \text{(Eq. 8)}$$

$$b_1 = f_c\Delta_t - \rho\left(\frac{\Delta_t}{T_c}\right)^2 n_\tau, \quad \text{(Eq. 9)}$$

$$c_1 = -f_c\Delta_t n_\tau + \frac{\rho}{2}\left(\frac{\Delta_t}{T_c}\right)^2 n_\tau^2. \quad \text{(Eq. 10)}$$

The embodiment of FIGS. 3–13 uses iteration techniques to generate $g_n$ and $\theta_n$ efficiently as piecewise quadratic functions of the form $$y_n=an^2+bn+c. \quad \text{(Eq. 11)}$$

The starting value $y_o$ is set equal to c, and each subsequent value $y_1, y_2, y_3 \ldots$ is determined iteratively according to Eq. 12:

$$y_{n+1}=y_n+T_n, \; y_o=c, \quad \text{(Eq. 12)}$$

where $T_o=a+b$ and each subsequent value $T_{n+1}=T_n+2a$. The envelope function (log domain) $g_n$ and the modulation phase $\theta_n$ for an ultrasonic transmit waveform can be expressed as follows:

envelope (log domain): $g_n=a_0 n^2+b_0 n+c_0,$ (Eq. 13)

and modulation phase: $\theta_n=a_1 n^2+b_1 n+c_1.$ (Eq. 14)

The modulated envelope (log domain) $y_n$ is therefore equal to modulated envelope (log domain): $y_n=g_n+LUT_{cos}[\theta_n]$
$=yint_n+yfrac_n,$ (Eq. 15)

where $$LUT_{cos}(k) = \log_2\left(\cos\left(\frac{\pi}{2}k\right)\right), k = [0 \ldots N_{table} - 1]/N_{table}, \quad \text{(Eq. 16)}$$

and the modulated envelope (linear domain) $\hat{x}_n$ is therefore equal to modulated envelope (linear domain): $x_n=2^{yint_n}LUT_{pwr}$
$[-yfrac_n],$ (Eq. 17)

where $$LUT_{pwr}(k) = 2^{-k}, k = \frac{[0 \ldots N_{table} - 1]}{N_{table}}. \quad \text{(Eq. 18)}$$

In Eq. 15 and 17, $yînt_n$ and $yfrâ_n$ represent the integer and fractional components of $\hat{y}_n$, respectively.

FIGS. 1–2 and the following discussion explain an accumulator implementation of Eq. 11 and 12, and the embodiment of FIGS. 3–13 provides one implementation of Eq. 13, 14, 15 and 17 that uses accumulators like that of FIG. 1. The above describes generation of a Gaussian pulse, but, by concatenating multiple fitted second order segments, any arbitrary transmit pulse can be generated.

Accumulator Timing

FIGS. 1 and 2 will be used to explain the timing and operation of an accumulator 10 of the type used in the embodiment of FIGS. 3–13. As shown in FIG. 1, the accumulator includes a memory 12 that stores a set of four parameters for each segment or zone of a selected ultrasonic transmit waveform. The accumulator 10 implements the equation $y_n = an^2 + bn + c$, and the four parameters for each zone include the values of a, b, and c for that zone as well as the value of z, the width or number of clock cycles of the zone.

In the following discussion, the parameters $a_n$, $b_n$, $c_n$, $z_n$ indicate the stored parameters for zone n, and the parameters $a_{n,i}$, $b_{n,i}$, $c_{n,i}$ indicate calculated values for cycle i of zone n that are used in implementing the quadratic equation for zone n defined by the parameters $a_n$, $b_n$, $c_n$.

Returning to FIG. 1, the parameters $a_n$, $b_n$, $c_n$, $z_n$ are stored in the memory 12 in compressed form as an integer exponent and a mantissa, and they are expanded in a shift register 14. The parameters $a_n$, $b_n$, $c_n$, $z_n$, for a given zone n are read out of the memory 12 in series (FIG. 2b), and they are routed by the multiplexers 16, 22, 26 and stored in the registers 18, 24, 30, respectively, during respective clock cycles, as shown in FIGS. 2f, 2g, 2h, 2i, 2j, and 2k. The summer 20 sums the output U of the register 18 with the output T of the register 24, and the summer 28 sums the output S of the register 30 with the output T of the register 24 (when the multiplexer 26 is in the logic 0 state).

FIGS. 2c, 2d, and 2e show the values of the signals U, T and S, respectively, at various clock cycles. Using the notation of Eq. 11 and 12 above, these signal values are shown in Table 1.

TABLE 1

| | | Zone 0 ($a_0$, $b_0$, $c_0$, $z_0$ = 4) | | Zone 1 ($a_1$, $b_1$, $c_1$, $z_1$ > 6) | |
|---|---|---|---|---|---|
| t | i | $b_{0,i}$ | $c_{0,i}$ | $b_{1,i}$ | $c_{1,i}$ |
| 0 | 0 | $a_0 + b_0$ | $c_0$ | | |
| 1 | 1 | $3a_0 + b_0$ | $a_0 + b_0 + c_0$ | | |
| 2 | 2 | $5a_0 + b_0$ | $4a_0 + 2b_0 + c_0$ | | |
| 3 | 3 | $7a_0 + b_0$ | $9a_0 + 3b_0 + c_0$ | | |
| 4 | 0 | | | $a_1 + b_1$ | $c_1$ |
| 5 | 1 | | | $3a_1 + b_1$ | $a_1 + b_1 + c_1$ |
| 6 | 2 | | | $5a_1 + b_1$ | $4a_1 + 2b_1 + c_1$ |
| 7 | 3 | | | $7a_1 + b_1$ | $9a_1 + 3b_1 + c_1$ |
| 8 | 4 | | | $9a_1 + b_1$ | $16a_1 + 4b_1 + c_1$ |
| 9 | 5 | | | $11a_1 + b_1$ | $25a_1 + 5b_1 + c_1$ |
| 10 | 6 | | | $13a_1 + b_1$ | $36a_1 + 6b_1 + c_1$ |

Note that the output S of the accumulator 10 (corresponding to the values of $c_{n,i}$ in Table 1) implements a piecewise quadratic equation, in which the values of S in each piecewise zone or segment are determined by the quadratic parameters $a_n$, $b_n$, $c_n$ stored in the memory 12 for the zone n. The accumulator 10 is efficient to implement, because multiplication operations are not required, and the hardware used to implement the described shifting and adding functions is relatively simple.

Specific Examples

FIGS. 3–13 provide detailed information regarding one preferred embodiment of this invention. As shown in FIG. 3, a medical diagnostic ultrasonic imaging system 100 includes a plurality of transmitters 102 that supply ultrasonic transmit waveforms via amplifiers 103 and a transmit/receive switch 104 to individual transducer elements of a transducer 106. The transducer 106 forms ultrasonic pressure waves in a region being imaged in response to these high voltage signals, and echoes from these pressure waves impinge upon the transducer 106. The resulting echo signals are passed via the transmit/receive switch 104 to a receiver 108 that beamforms, detects and demodulates the echo signals to form received beam signals that are processed by an image processor 110 for display on a display 112.

Depending upon the application, the ultrasonic transmit waveforms supplied by the transmitters 102 may be processed (e.g. delayed, phased, apodized, gain-calibrated, delay-calibrated, and phase-calibrated) to cause the ultrasonic waves emitted by the transducer 106 to be focused along selected scan lines, though this is not a requirement for all embodiments. The elements 102–112 can take any suitable form, and the present invention is suitable for use with the widest variety of such devices.

Continuing with FIG. 3, each transmitter 102 includes multiple transmit waveform generators 120, each generating a respective ultrasonic transmit waveform. Selected ones of the transmit waveforms are summed in a beam summer 122, and selected ones of the summed beams are combined in a channel summer 124. The resulting combined transmit waveforms are gain controlled and clipped in respective stages 126, filtered in respective filters 128 and encoded in respective encoders 130.

The following discussion will concentrate on the transmit waveform generators 120, and any suitable alternative can be used for the remaining elements 122–130, depending upon the application. The channel summer 124, the filters 128, and the encoders 130 are optional, and may be deleted in some embodiments. Similarly, the beam summer 122 is not required in all embodiments.

As shown in FIG. 4, each of the transmit waveform generators 120 includes RAM memories 150, 152 for storing envelope and phase parameters, respectively. Envelope parameters from the memory 150 are applied to an envelope accumulator 154, and phase parameters from the RAM 152 are applied to a phase accumulator 156. The accumulators 154, 156 generate envelope functions and phase functions, respectively, and these functions are applied to an envelope/phase processor 158. The envelope function is in the log domain in one mode of operation. The envelope/phase processor 158 combines the envelope function with the phase function, in the log domain in this mode of operation, converts the result to the linear domain, and supplies as an output an ultrasound transmit waveform that is applied to the beam summer 122 of FIG. 3.

Figure 5:
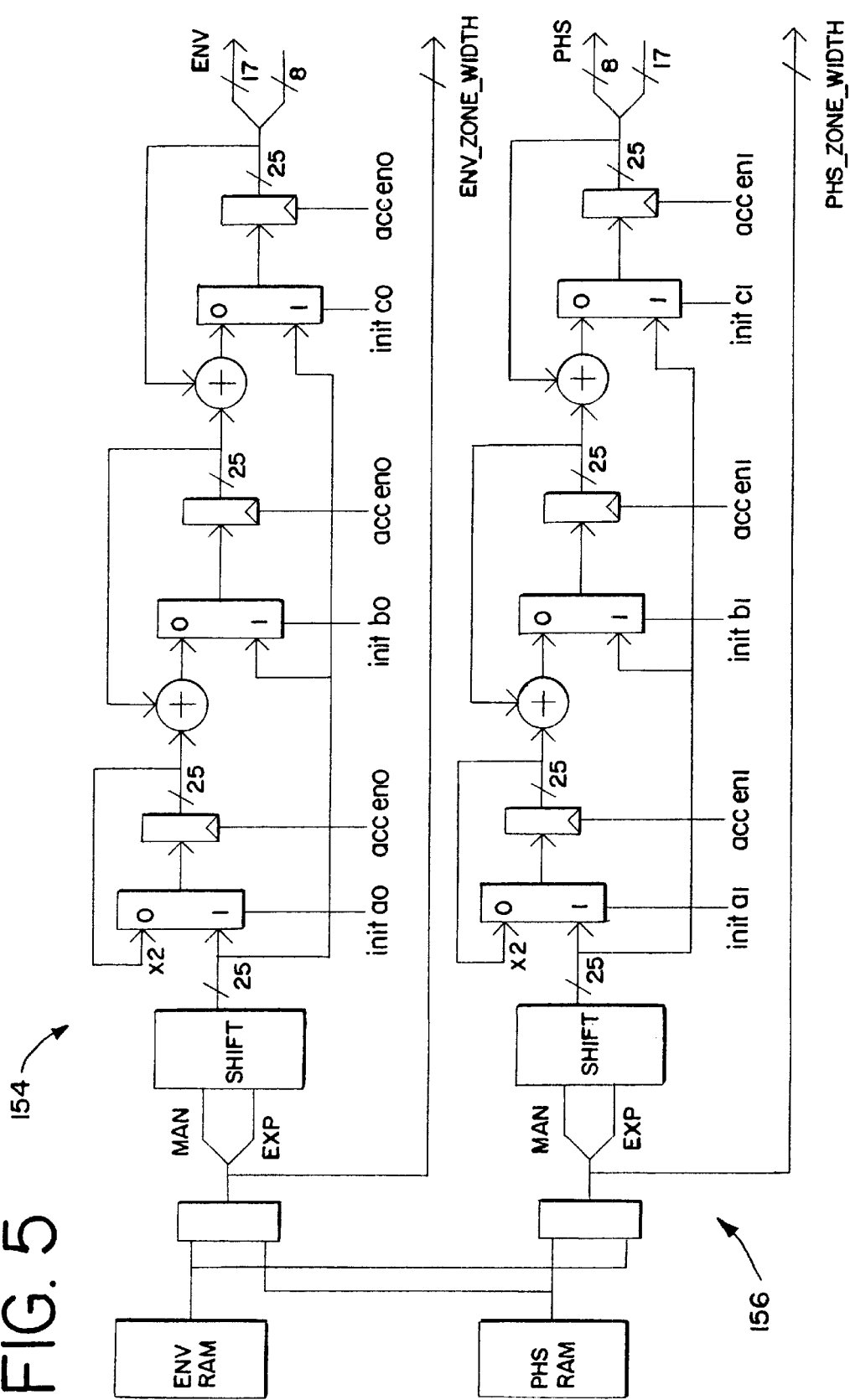
FIG. 5 is a more detailed block diagram of the envelope accumulator 154 and the phase accumulator 156 of FIG. 4.

FIG. 5 provides details of construction of one preferred embodiment of the envelope accumulator 154 and the phase accumulator 156. Note that the accumulators 154, 156 in this embodiment operate as described above in conjunction with FIGS. 1 and 2a–2k. In this mode of operation, the output signal env of the envelope accumulator 154 defines the envelope of the transmit waveform in log domain, and the output signal phs of the phase accumulator 156 defines the phase function $\theta(t)$. The output signals env_zone_width and phs_zone_width correspond to the z parameter discussed above, and are used to control the timing at which the next set of parameters is read out of the memories 150, 152 such that the signals env, phs are both constructed in a piecewise manner, with each piece corresponding to a respective segment or zone of the ultrasonic transmit waveform in the quadratic form defined by the respective set of stored parameters.

Figure 6:
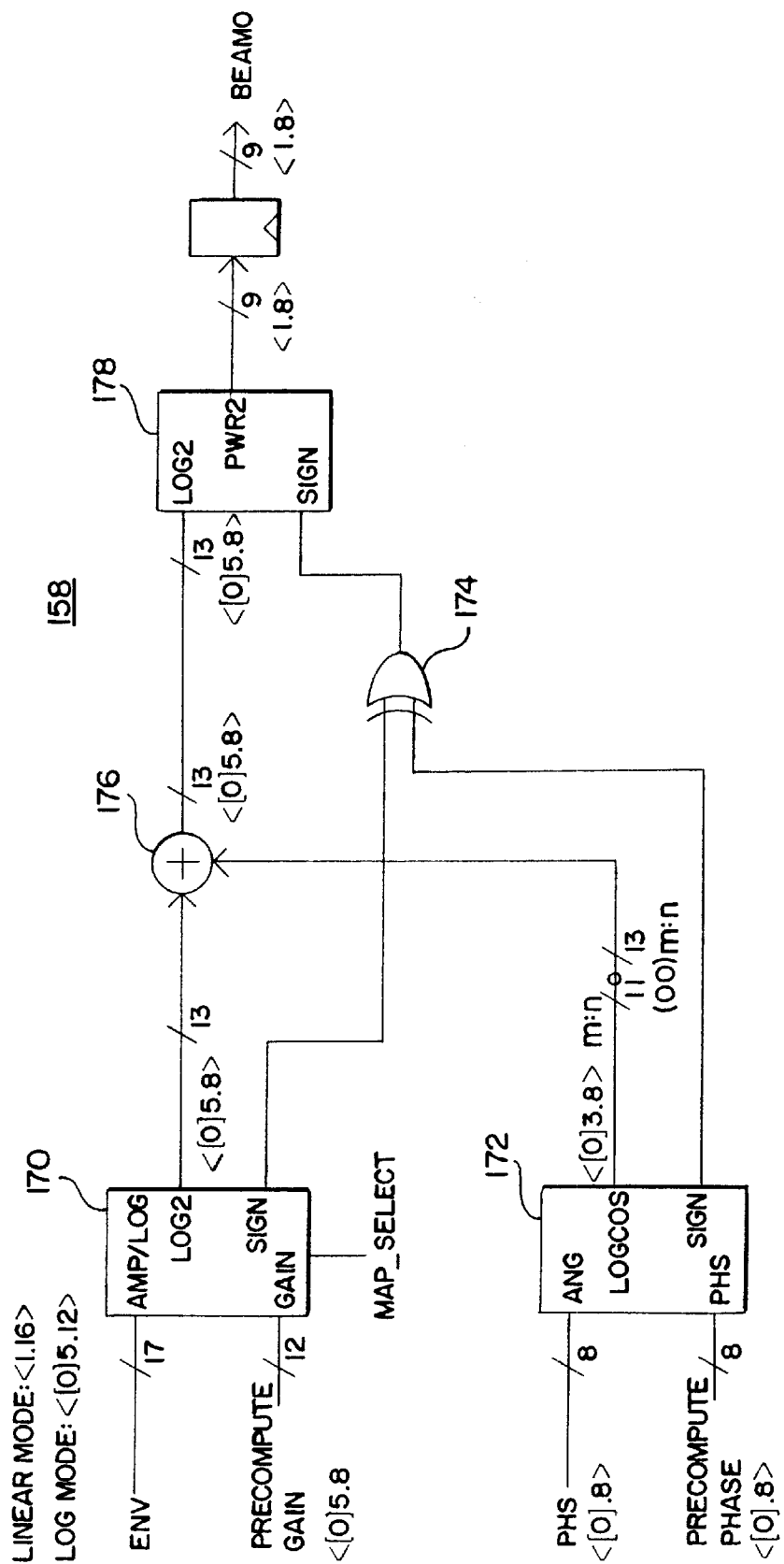
FIG. 6 is a more detailed diagram of the envelope/phase processor 158 of FIG. 4.
Figure 7:
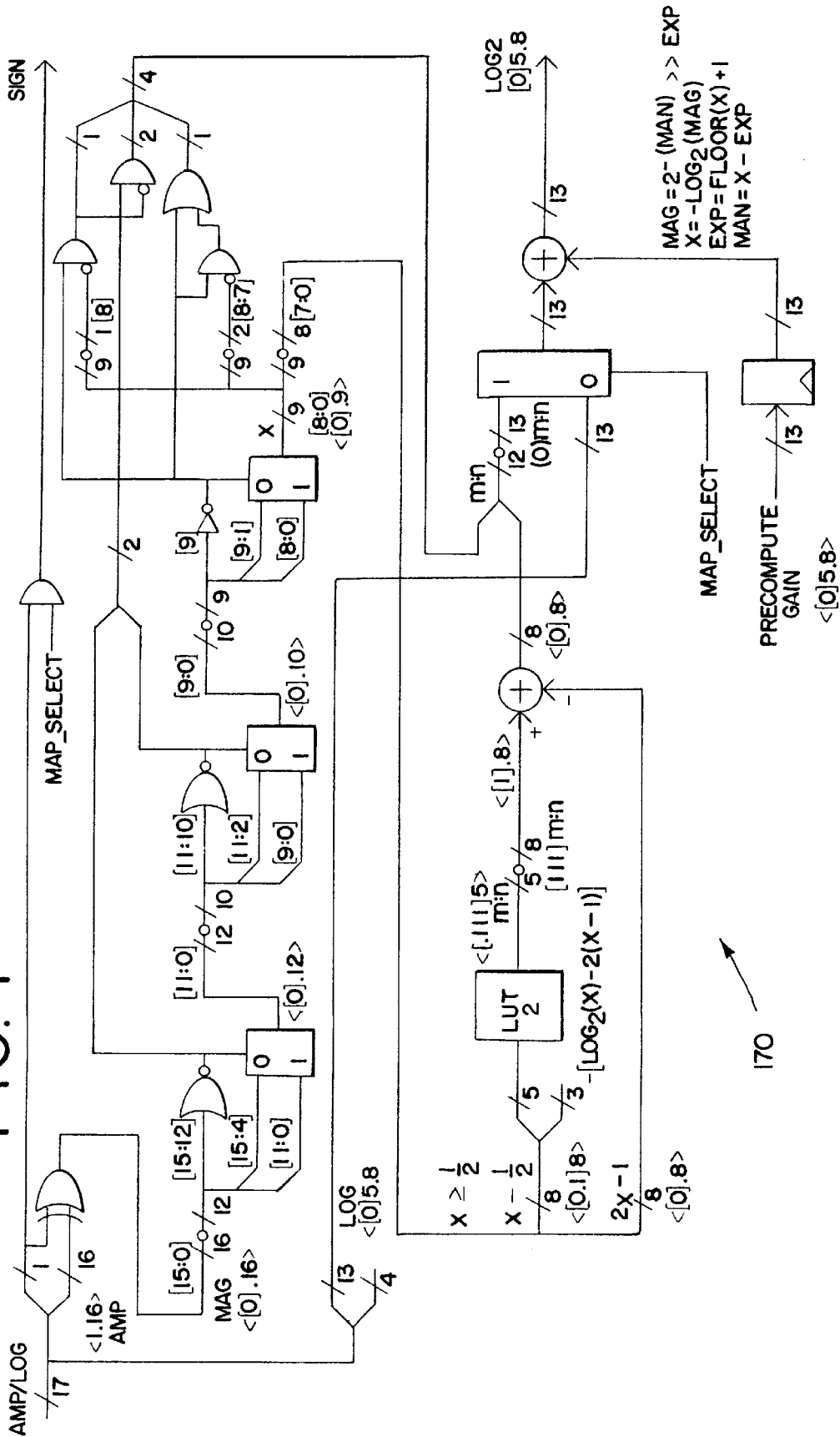
FIG. 7 is a circuit diagram of the envelope stage 170 of FIG. 6.

FIG. 6 shows a more detailed view of the envelope/phase processor 158 of FIG. 4. The processor 158 includes an envelope stage 170 that receives the signal env from the envelope accumulator 154 along with a pre-computed gain signal. The pre-computed gain signal may represent an apodization signal, a calibration signal, a scaling signal, or any combination of these and other signals. Combining the various gain terms is efficient because the gain terms are simply added in the log domain. The envelope stage 170 operates in two states, depending upon the state of the map_select signal. In a first state, the signal env is added directly with the pre-computed gain signal in the log domain. In this mode the signal corresponds to a Gaussian envelope in the linear domain. In a second state, the env signal is converted from linear domain to log domain and then added to the pre-computed gain signal. In this mode the signal corresponds to a quadratic envelope in the linear domain. FIG. 7 illustrates one preferred circuit for implementing the envelope stage 170 of FIG. 6.

Figure 8:
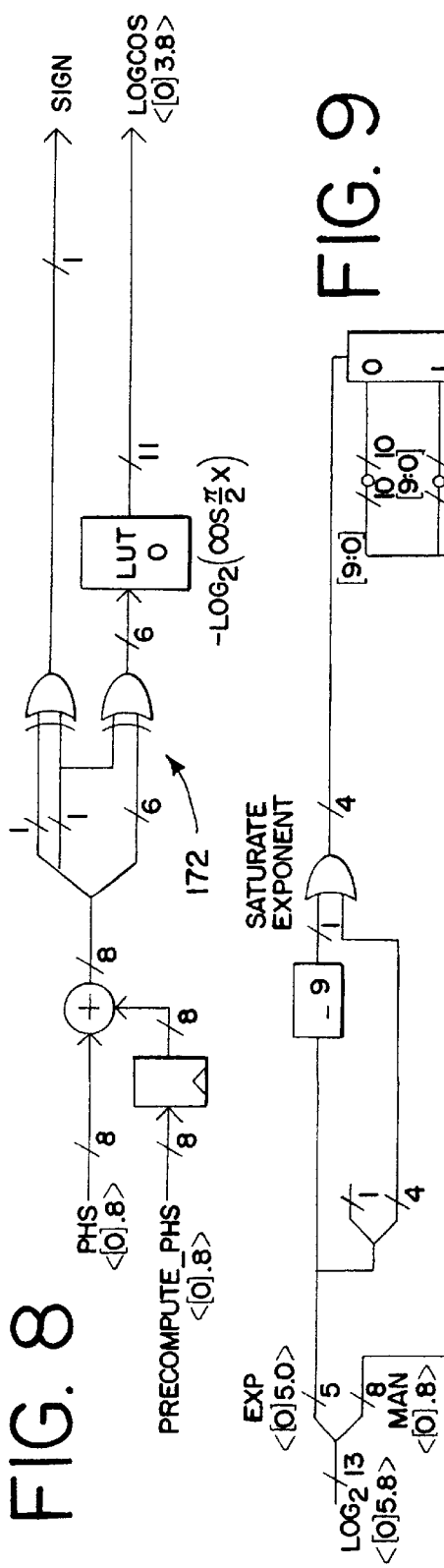
FIG. 8 is a circuit diagram of the phase stage 172 of FIG. 6.

The processor 158 of FIG. 6 also includes a phase stage 172 that receives as inputs the phs signal from the phase accumulator 156 and a pre-computed phase signal. The pre-computed phase signal may represent calibration values or other desired offsets for the modulation phase angle of the transmit waveform, such as a phase adjustment to approximate a fine delay. The phase stage 172 supplies two output signals: logcos, which is the log base 2 of the cosine of the sum of the signal phs and the pre-computed phase, and sign, which is the sign of logcos. FIG. 8 shows a circuit diagram for one preferred form of the phase stage 172.

Figure 9:
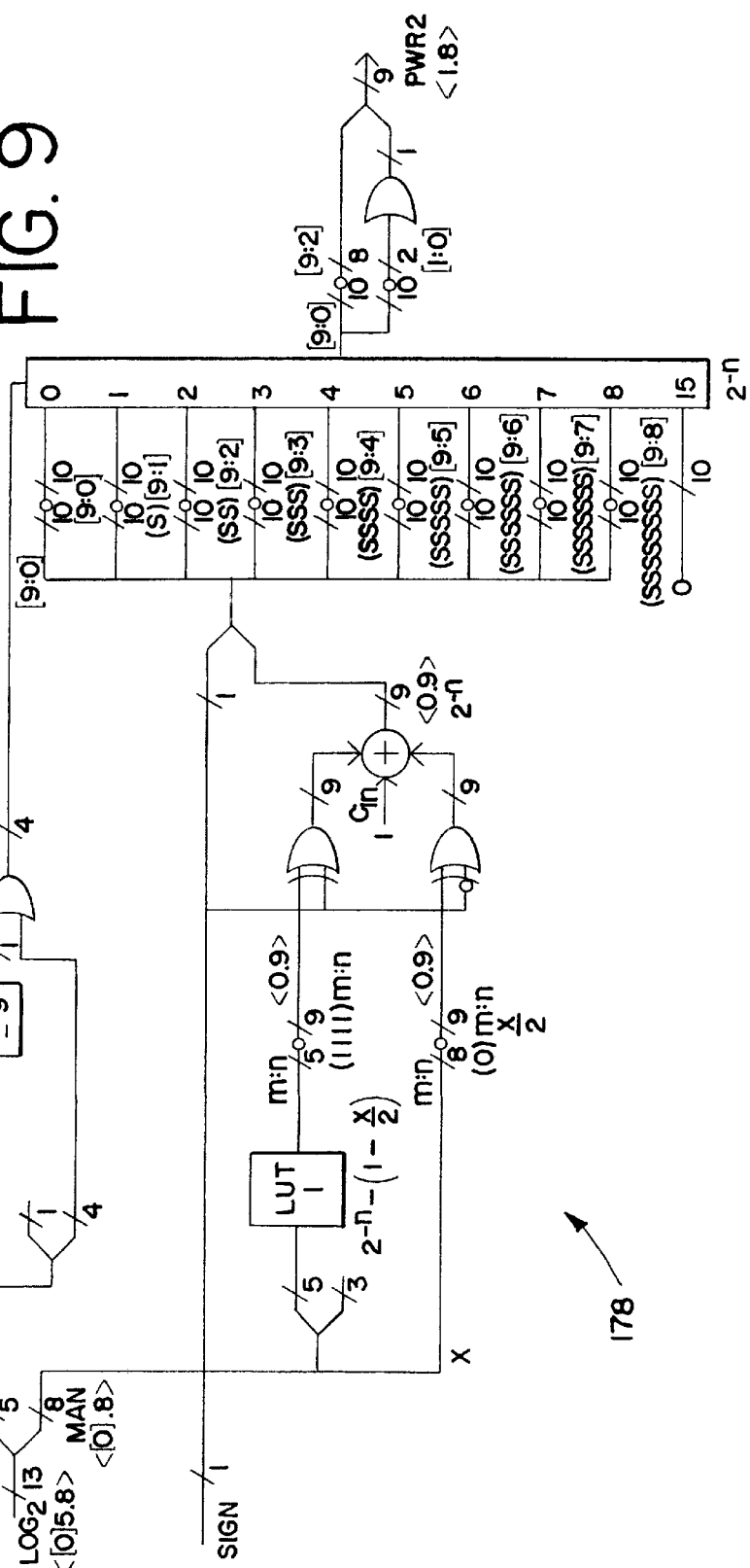
FIG. 9 is a circuit diagram of the log-linear stage 178 of FIG. 6.

The processor 158 of FIG. 6 includes a summer 176 that combines the log output of the envelope stage with the logcos output of the phase stage. In effect, the summer 176 operates in log domain to modulate the envelope signal supplied by the envelope stage 170 with a modulation signal supplied by the phase stage 172. The output of the summer 176 is applied to a log-to-linear stage 178 that converts the modulated envelope signal in log domain supplied by the summer 176 to linear domain. The log-to-linear stage 178 receives another input from a gate 174 that defines the sign of the resulting output signal. FIG. 9 is a circuit diagram for one preferred form of the log-to-linear stage 178.

The output of the log-to-linear stage 178 is an ultrasonic transmit waveform in linear domain that is applied as an output of the transmit waveform generator 120.

With reference to the equations of the foregoing general discussion, the envelope accumulator 154 of FIGS. 4 and 5 generates the signal env according to Eq. 13, and the phase accumulator 156 of FIGS. 4 and 5 generates the signal phs according to Eq. 14. Similarly, the lookup table LUT 0 of FIG. 8 implements Eq. 16, and the lookup table LUT 1 of FIG. 9 implements a function closely related to that of Eq. 18.

It should be noted that the transmit waveform generator 120 calculates the ultrasonic transmit waveform based on a parametric description of the transmit waveform. The embodiment described above has been optimized for the calculation of linear FM modulated Gaussian pulses. In addition, this embodiment has the flexibility to generate arbitrary transmit waveforms by fitting both the envelope amplitude and the modulating phase angle to any desired number of piecewise second order sections. The accumulators described above are a particularly efficient hardware implementation. Because the computations are performed in the log domain, all multipliers are replaced by adders and small lookup tables. This efficiency allows dedicated hardware to be used for each transmit waveform.

The embodiment described above provides a number of important advantages:

1. It may be efficiently configured for modulated Gaussian transmit waveforms, including chirps. Only eight parameters are used to define any piecewise segment of the transmit waveform, independent of the desired length of the segment.
2. It provides a very wide pulse bandwidth, since the sampling frequency is at RF and filter effects can therefore be completely avoided.
3. It completely avoids extraneous aliased signal components at lower center frequencies, because no up-sampling techniques are required.
4. It allows high bandwidth pulses to be matched to the ideal case with excellent accuracy.
5. As described below, up to four separate ultrasonic transmit waveforms can be combined to form a multibeam transmit waveform, and this is independent of the center frequency or the bandwidth that is used for individual transmit waveforms. This is the case because the individual transmit waveforms are generated in parallel.
6. It provides high time delay resolution for all center frequencies and it retains fine delay resolution via phasing adjustments.
7. It uses a single, highest system clock in operation and is able to modulate to an arbitrary carrier frequency without deleterious filter effects.
8. It uses multiple piecewise quadratic functions to approximate arbitrary envelope and phase functions.

Though less efficient, alternative embodiments of this invention can be implemented using multipliers in the linear domain rather than adders and lookup tables in the log domain as described above.

Figure 10:
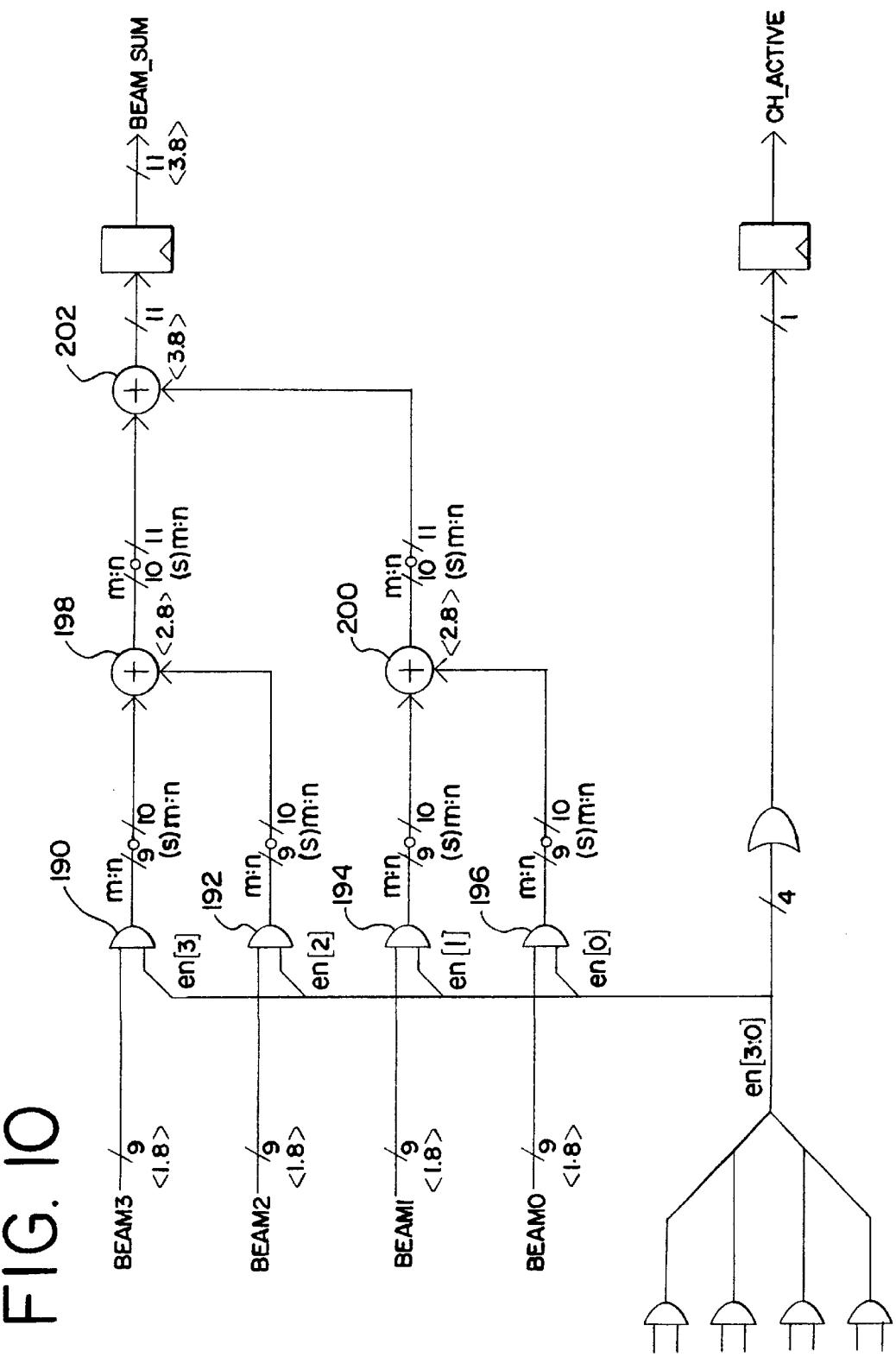
FIG. 10 is a circuit diagram of the beam summer 122 of FIG. 3.

A preferred implementation for the beam summer 122 of FIG. 3 is shown in FIG. 10. The gates 190, 192, 194, 196 can be used to pass any selected ones of four ultrasonic waveform signals to the summers 198, 200, 202 and thereby to the output. The output signal beamsum is thus the combination of any one, any two, any three, or all four of the input transmit waveforms. The term "beam channel" will be used here to refer either to the output of one of the generators 120 or the output of the beam summer 122.

Figure 11:
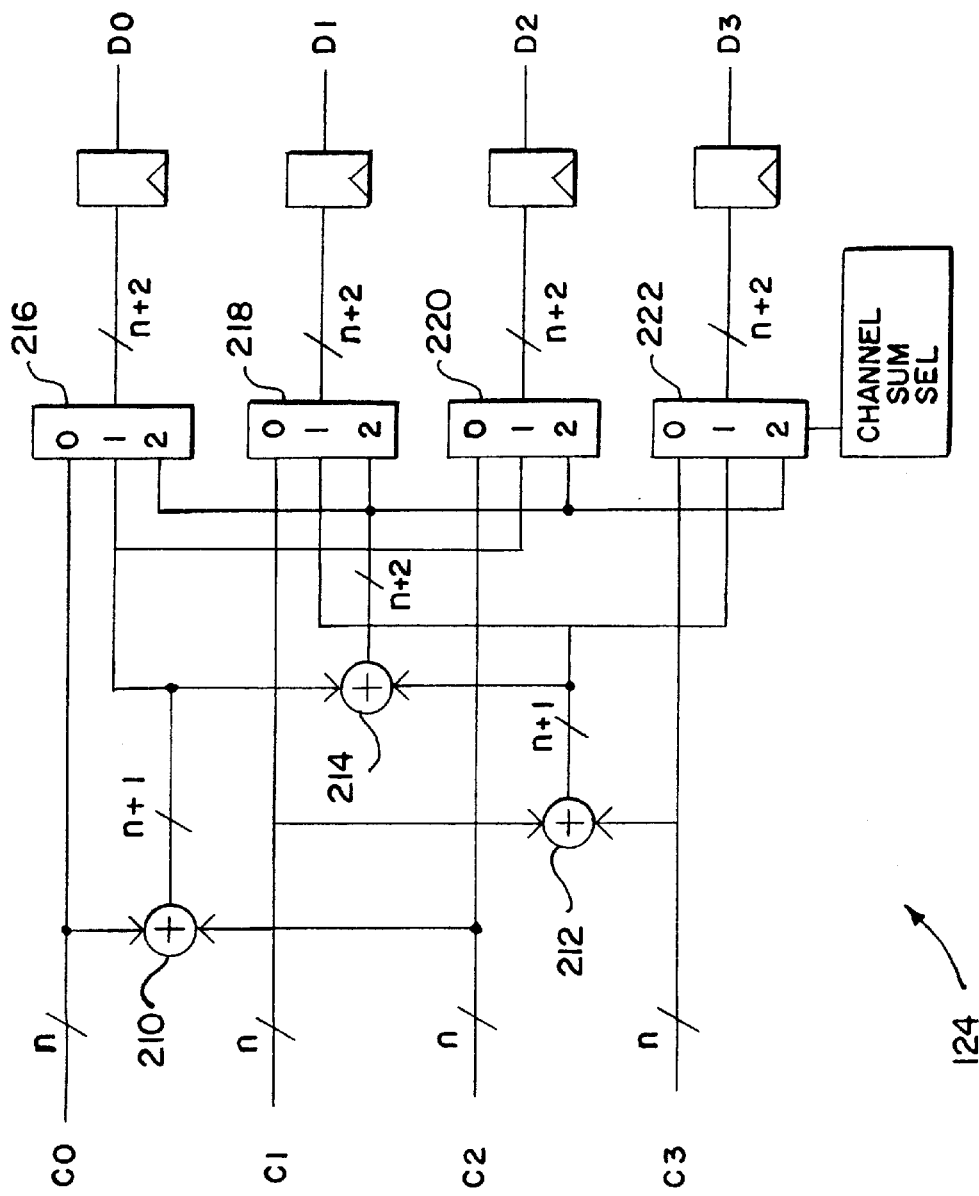
FIG. 11 is a circuit diagram of the channel summer 124 of FIG. 3.

FIG. 11 provides more detail regarding one implementation of the channel summer 124 of FIG. 3. The channel summer in-this embodiment receives four beam channel inputs and supplies four output signals, each destined for a respective transducer element. The term "transducer channel" will be used here to refer to such output signals, at any stage along the path from the channel summer 124 to the associated transducer element.

The channel summer 124 includes summers 210, 212, 214 that provide summation signals to multiplexers 216, 218, 220, 222. These multiplexers have three states as indicated. In state 0, each of the four input channels C0, C1, C2, C3 is simply applied without alteration to the respective output terminal D0, D1, D2, D3, and all of the output terminals D0, D1, D2, D3 are active. When the multiplexers are in state 1, the sum of the signals on channels C0 and C2 is applied in parallel to output terminals D0 and D2, the sum of input channels C1 and C3 is applied in parallel to output terminals D1 and D3, and one output terminal is active in each subset D0, D2; D1, D3. When the multiplexers are in state 2, all four of the input channels C0, C1, C2 and C3 are summed, this sum is applied in parallel to all four of the output terminals D0, D1, D2, D3, and only one of the output terminals D0, D1, D2, D3 is active. The channel summer 124 is an example of a combiner. Other examples include multipliers or dividers that combine two or more beam channels, time interleavers, and time concatenators.

Figure 12:
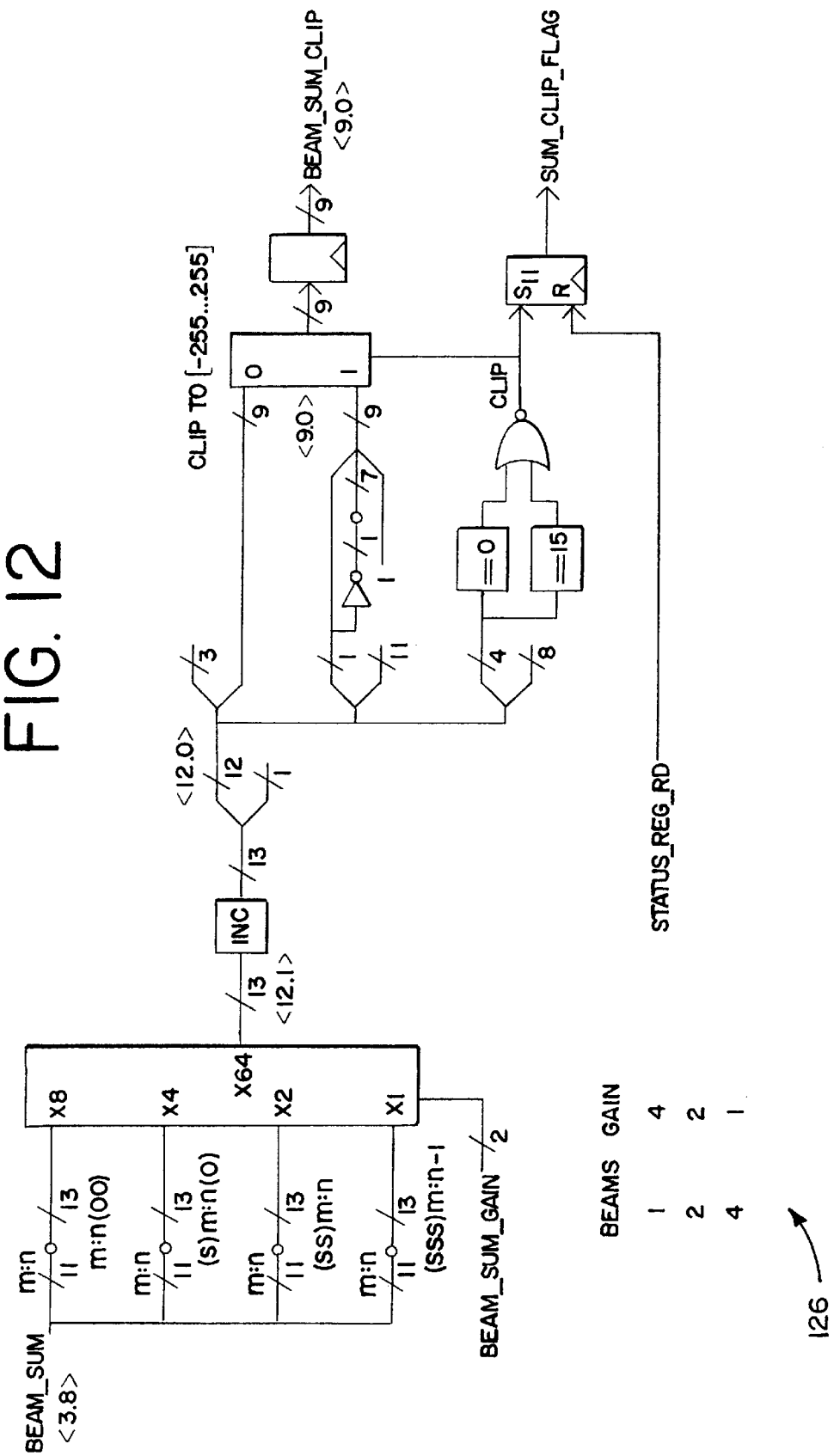
FIG. 12 is a circuit diagram of the gain and clip stage 126 of FIG. 3.
Figure 13:
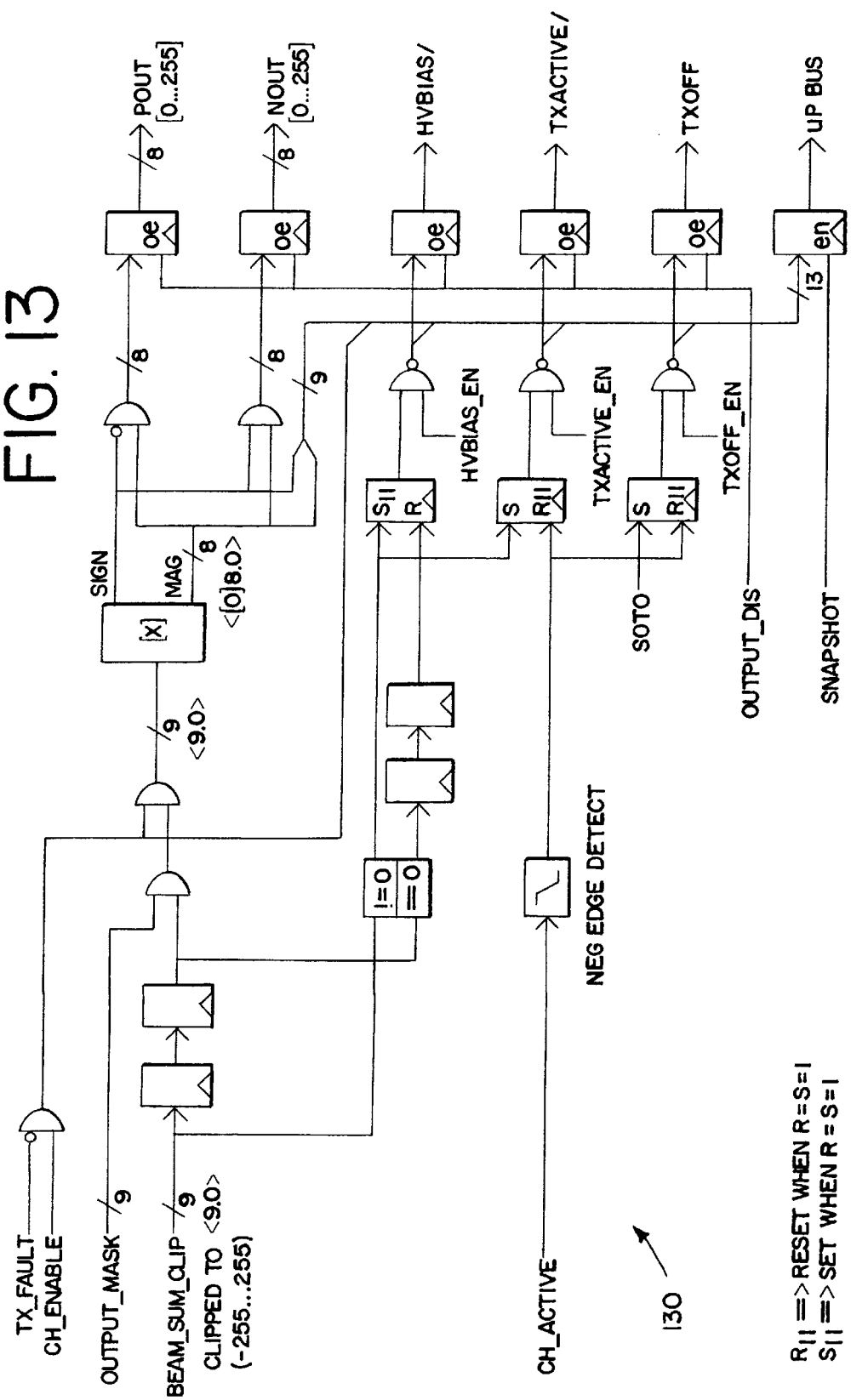
FIG. 13 is a circuit diagram of the encoder 130 of FIG. 3.

FIGS. 12 and 13 provide additional information regarding one preferred implementation of the stage 126 and the encoder 130 of FIG. 3, respectively.

By way of illustration, the circuits described above for the transmitter 102 can preferably be implemented in an ASIC that includes the elements 120–130 for four transducer channels per package. Preferably, the output resolution is plus or minus 256 codes, and the maximum envelope sampling rate is equal to 56 MHz. The total number of transmit waveforms per beam channel can be varied between 1 and 4, and the maximum transmit pulse length for a real/complex envelope is greater than 8192 sampled at 56 MHz.

Transmit Waveform Examples

The system described above in connection with FIGS. 3–13 can generate a wide variety of transmit waveforms. This section provides a few examples, as well as examples for modified versions of the illustrated system.

a. Single-Channel Gaussian Transmit Waveforms

FIGS. 14–18 relate to a first example, in which a single transmit waveform generator 120 generates a Gaussian transmit waveform for each respective beam channel. In this example, the beam summer 124 selects only a single generator 120 for each respective beam channel, and the channel summer 124 passes the signal on each beam summer output directly to the respective transducer channel.

Figure 14:
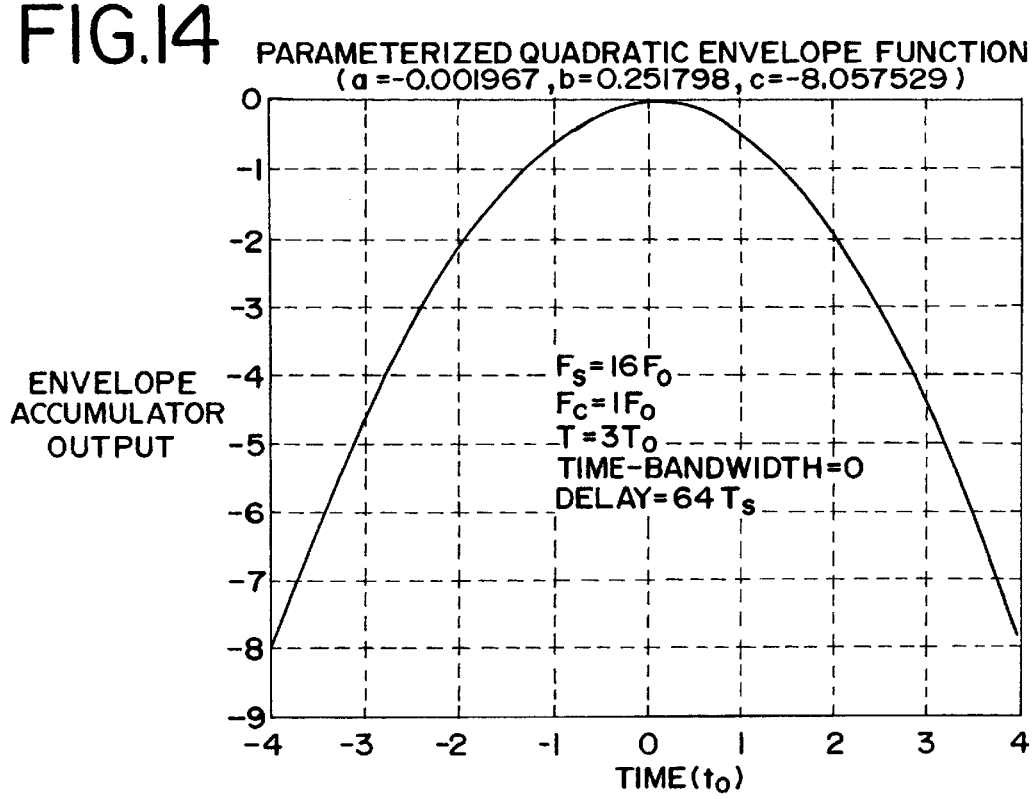
FIGS. 14–18 are graphs used to describe the generation of a Gaussian transmit waveform.

FIG. 14 shows one example of the output signal env of the envelope accumulator 154 described above in conjunction with FIG. 5, for the following coefficient values:

a=−0.001967;
b=0.251798;
c=−8.057529.

Figure 15:
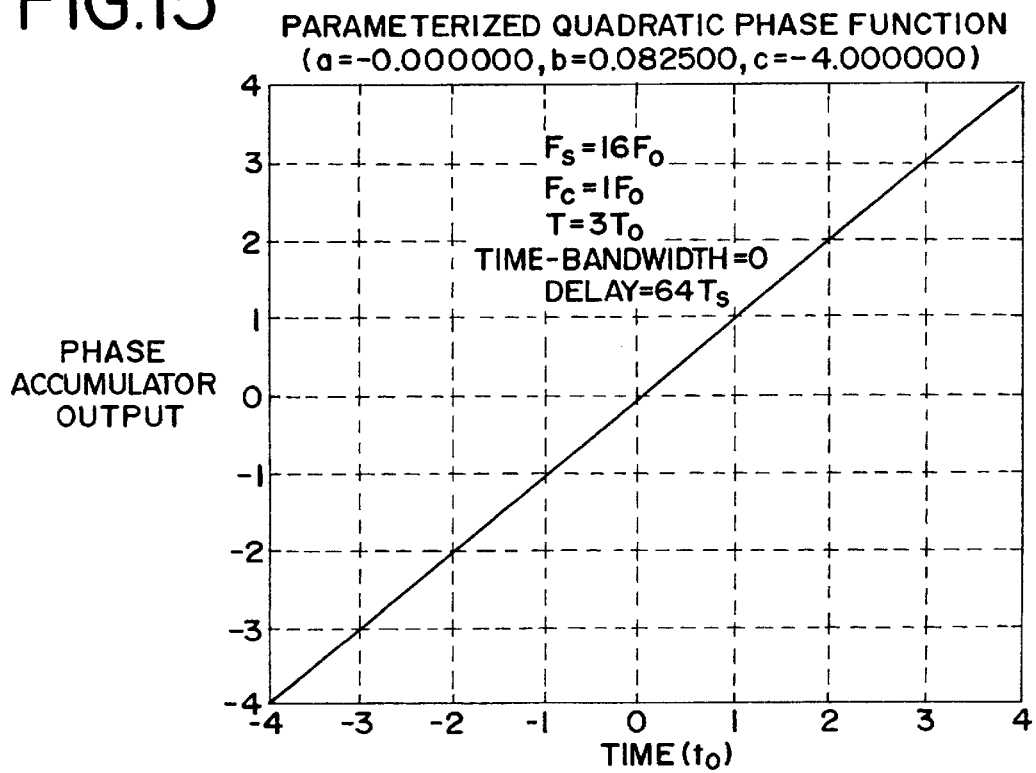

FIG. 15 shows one example of the output signal phs of the phase accumulator of FIG. 5 for the following coefficient values:

a=0.000000;
b=0.082500;
c=−4.000000.

Figure 16:
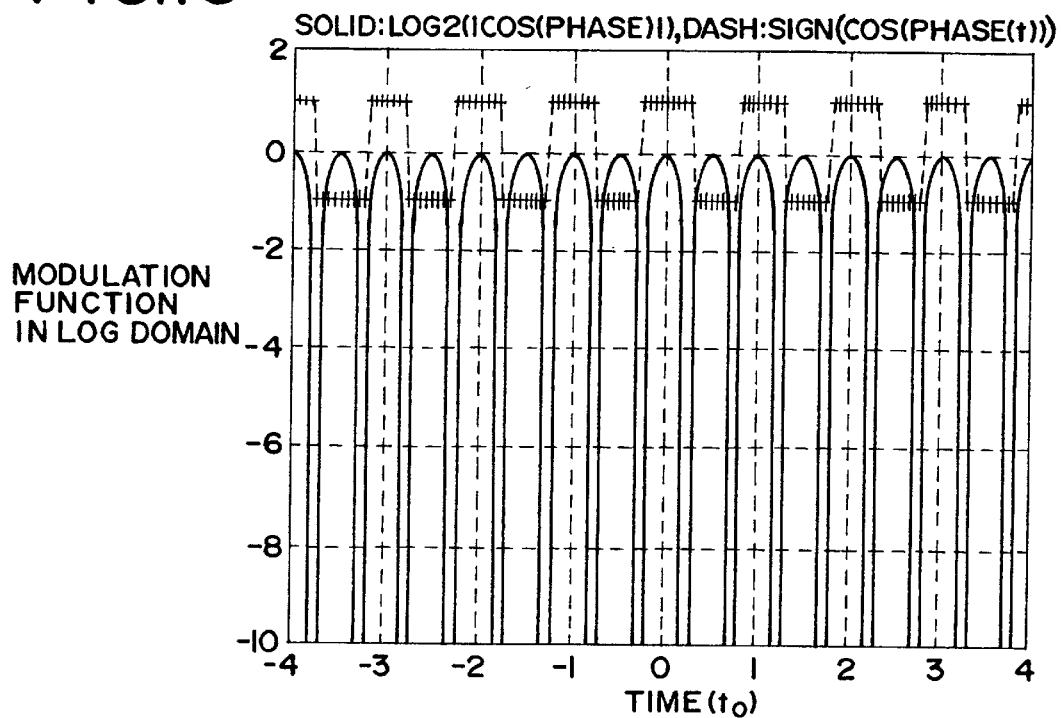
Figure 17:
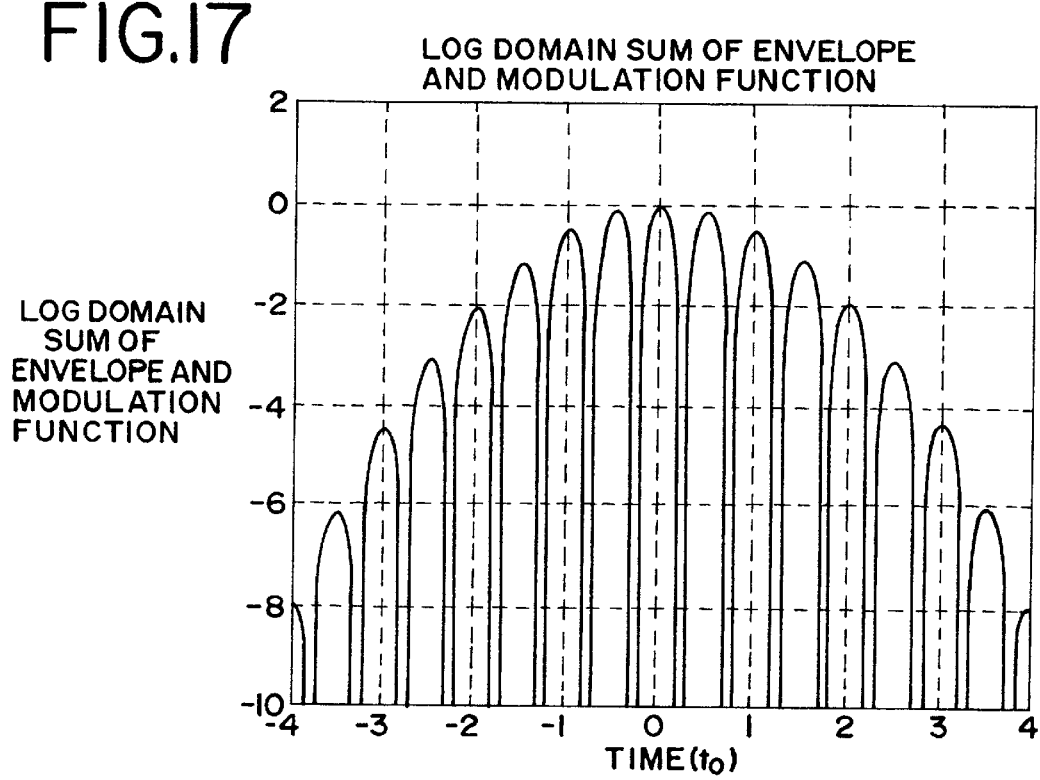
Figure 18:
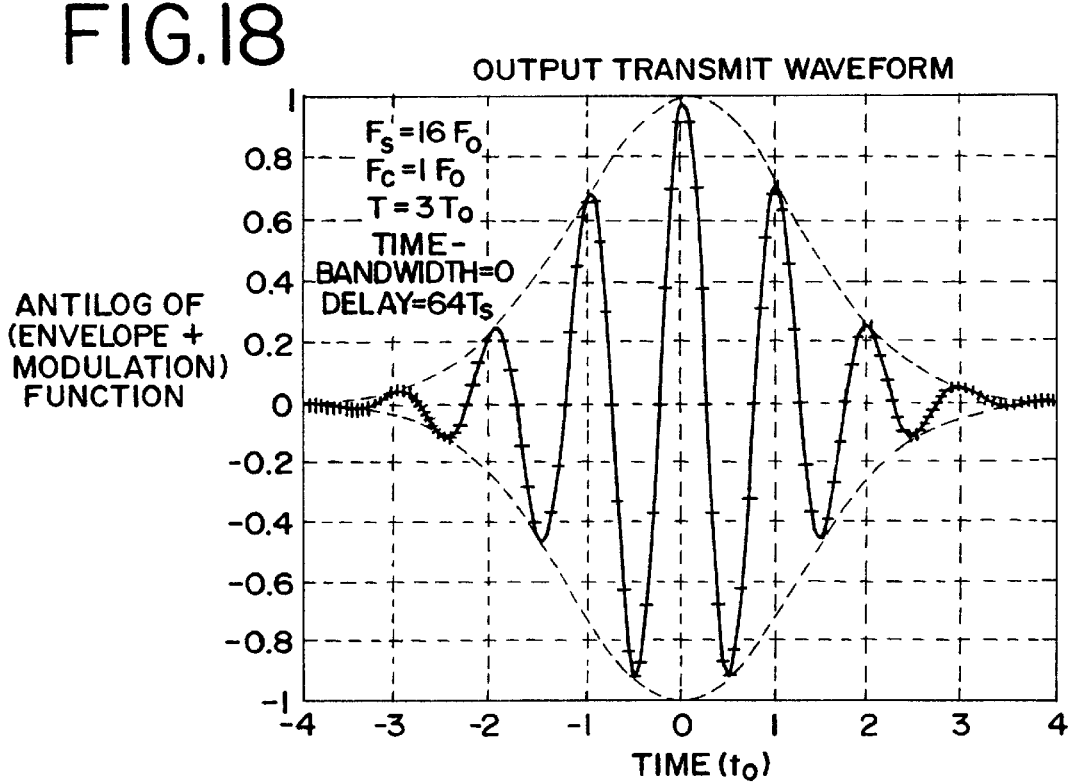
Figure 19:
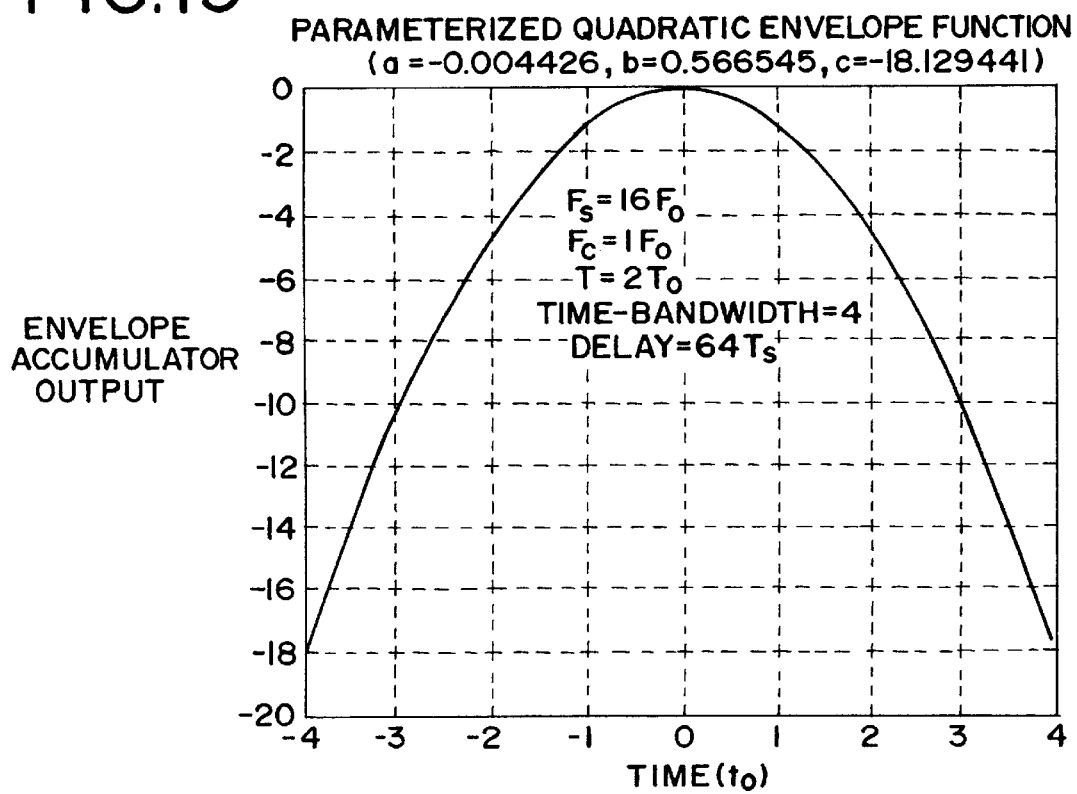
FIGS. 19–23 are graphs used to describe the generation of a linear FM Gaussian transmit waveform.

FIG. 16 shows the resulting signals logcos and sign of FIG. 6, for the case where precompute phase is equal to zero; and FIG. 17 shows the log domain output of the summer 176 of FIG. 6. The resulting linear domain ultrasonic transmit waveform (the beam 0 signal of FIG. 6) is shown in FIG. 18. This waveform has a Gaussian envelope with a gradually rising leading edge and a gradually falling trailing edge.

b. Single-Channel, Linear-FM, Gaussian Transmit Waveforms

Figure 20:
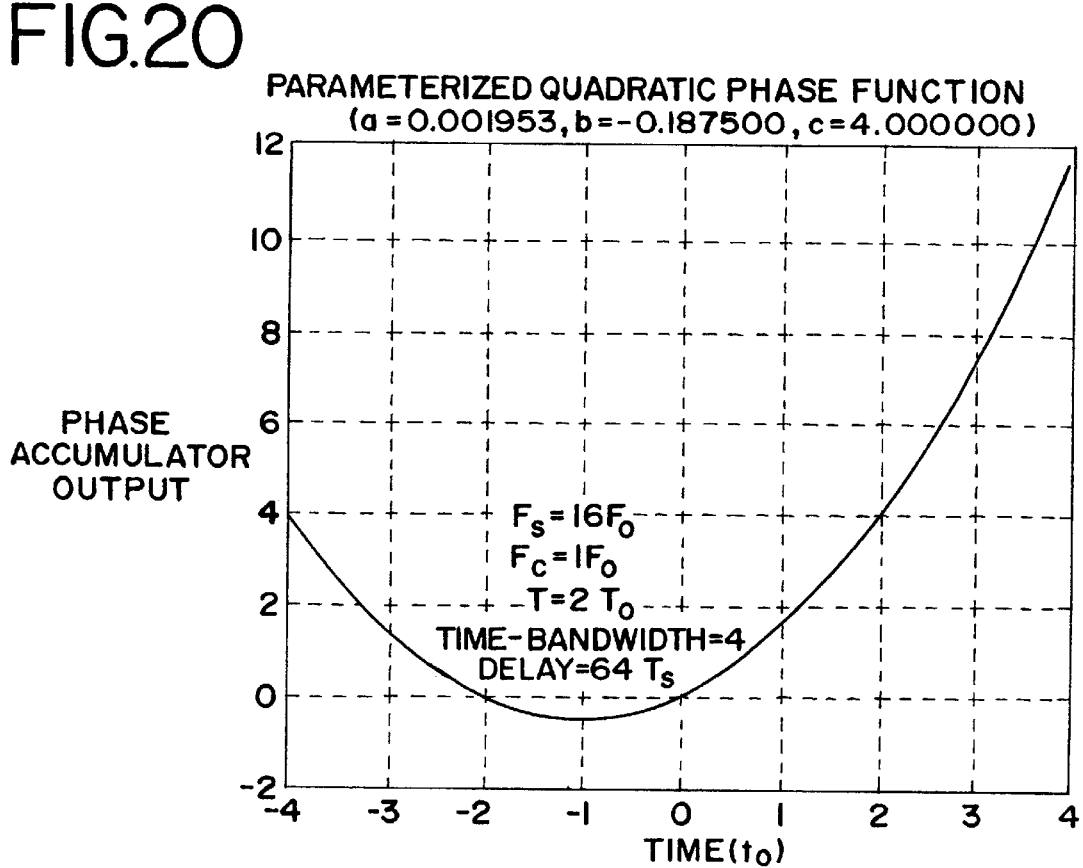

FIGS. 19–23 correspond to FIGS. 14–18, respectively, for a different set of quadratic coefficients. In this case, the coefficient values used for the envelope function of FIG. 19 and the phase function of FIG. 20 are as follows:

| envelope | Phase |
|---|---|
| a = −0.004426 | a = 0.001953 |
| b = 0.566545 | b = −0.187500 |
| c = −18.129441 | c = 4.000000 |

Figure 21:
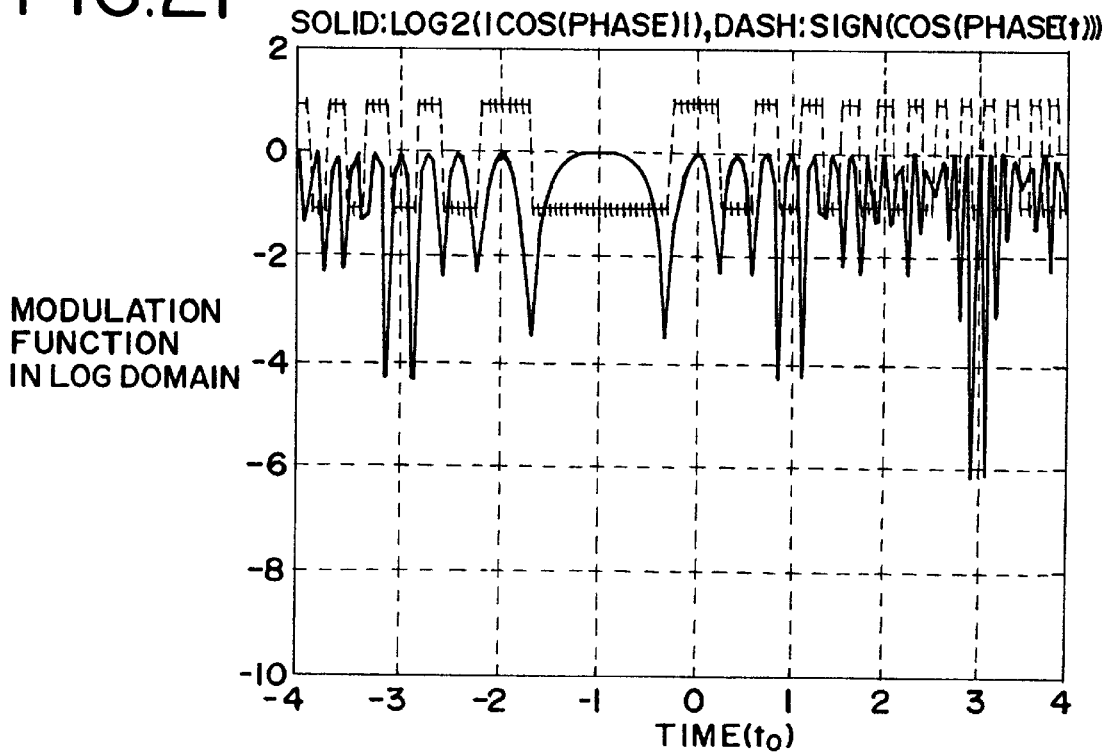
Figure 22:
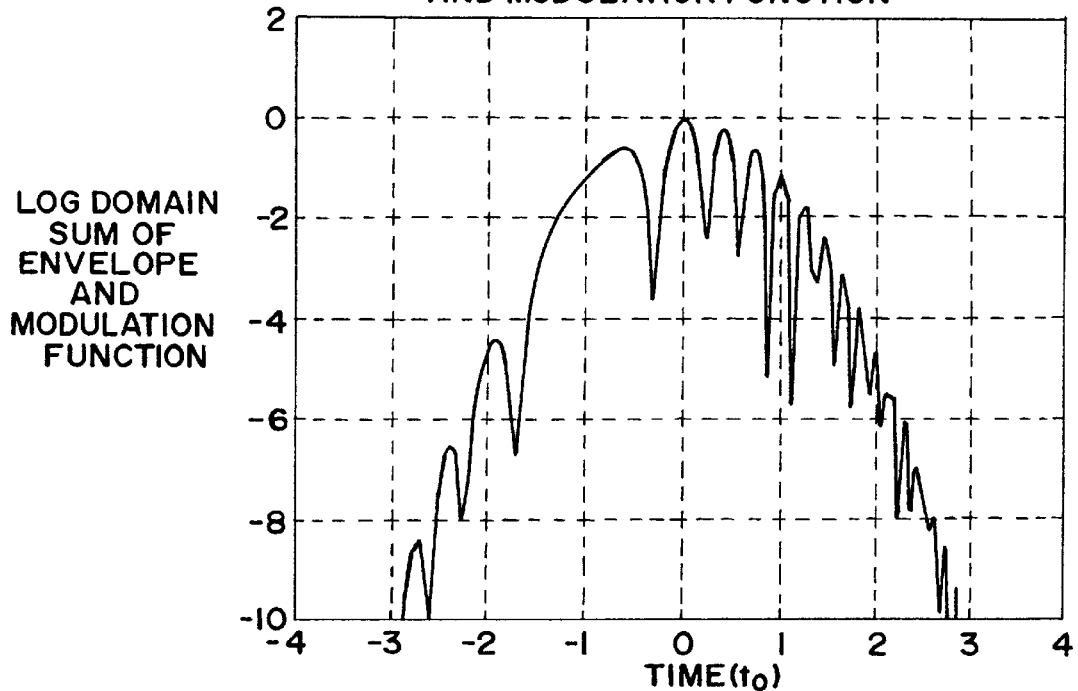
Figure 23:
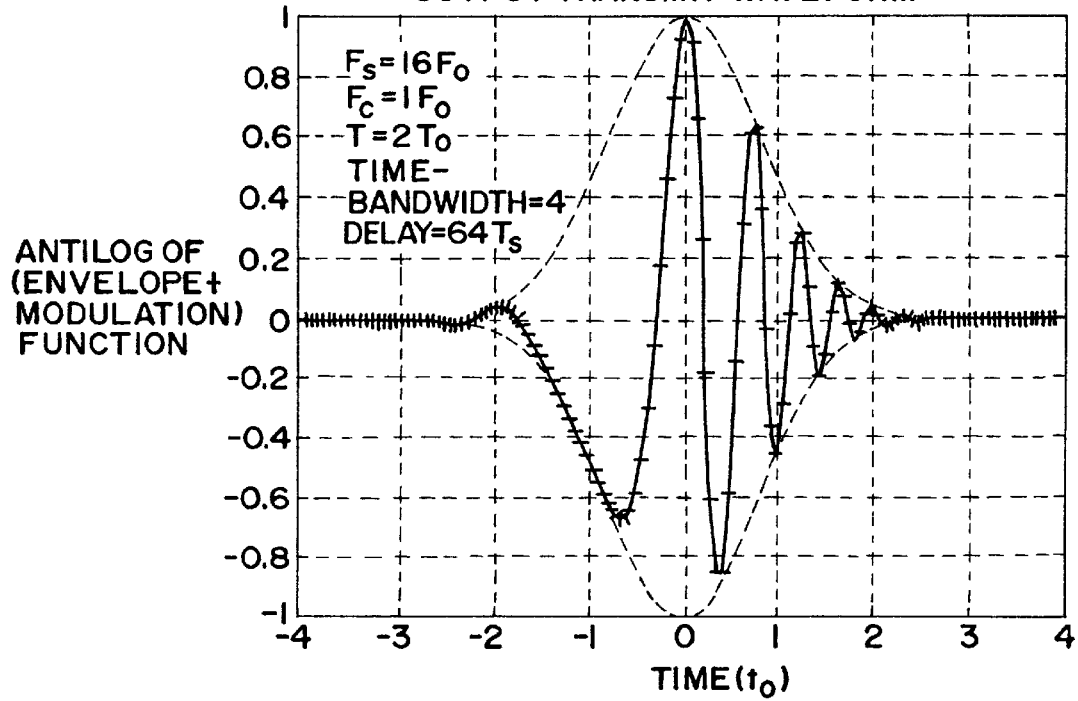

The resulting logcos and sign signals are shown in FIG. 21 and the resulting sum of the envelope and modulation functions (log domain) is shown in FIG. 22. The resulting ultrasonic transmit waveform (linear domain) is a linear-FM, Gaussian pulse, as shown in FIG. 23.

c. Single-Channel Transmit Waveforms with Envelope Parameterized by Functions Based on Cosines The examples described above use quadratic functions to approximate the desired functions, but other parametric functions may be used. For example the envelope function env(t) of the ultrasonic waveform may be parameterized using cosine-based functions as follows:

$$env(t) = \sum_{k=0}^{3} a_k \cos\left(2\pi \cdot k\left(\frac{t}{T}\right)\right), \frac{-T}{2} \le t \le \frac{T}{2};$$

$$= 0, |t| > \frac{T}{2}.$$

Figure 24:
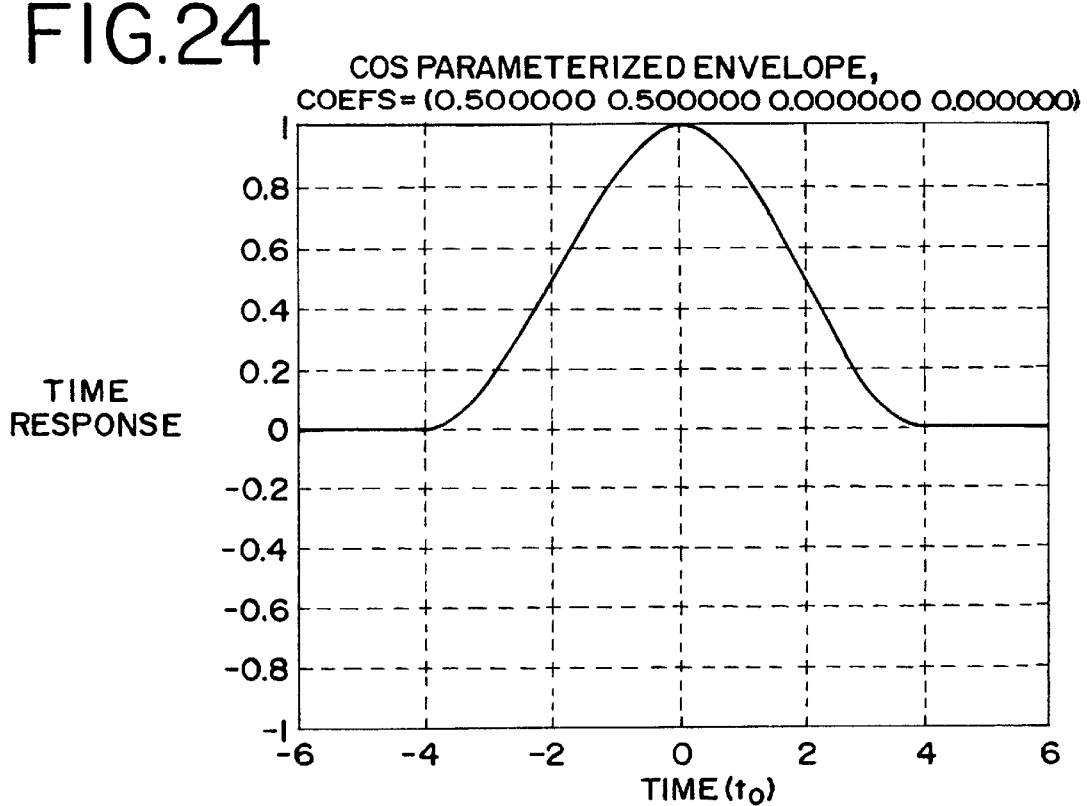
FIGS. 24 and 25 are time and frequency domain graphs of a Hanning pulse, respectively.
Figure 25:
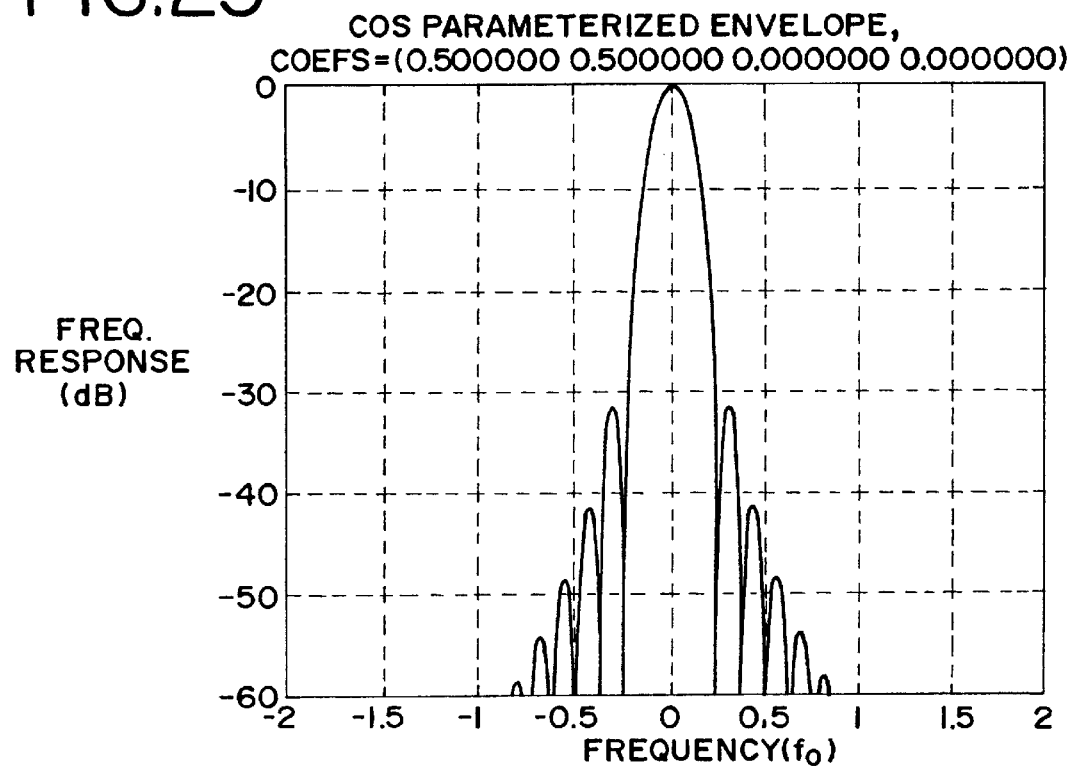
Figure 26:
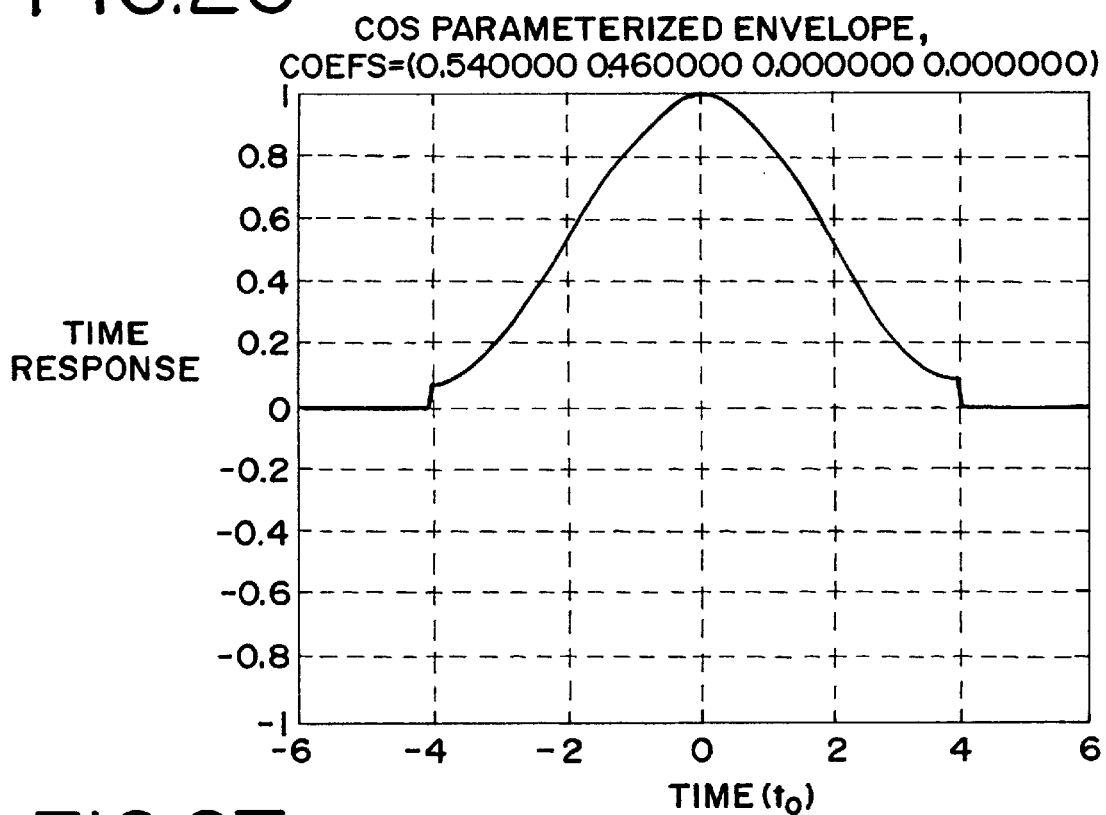
FIGS. 26 and 27 are time and frequency domain graphs of a Hamming pulse, respectively.
Figure 27:
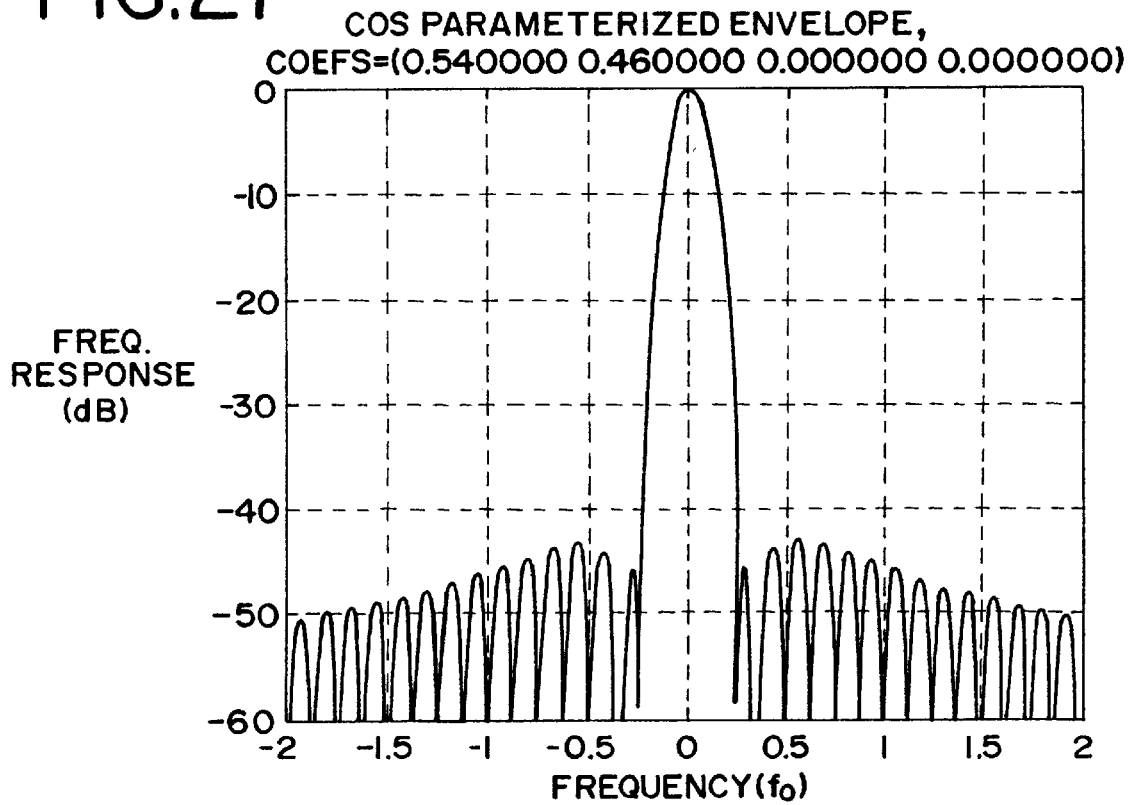
Figure 28:
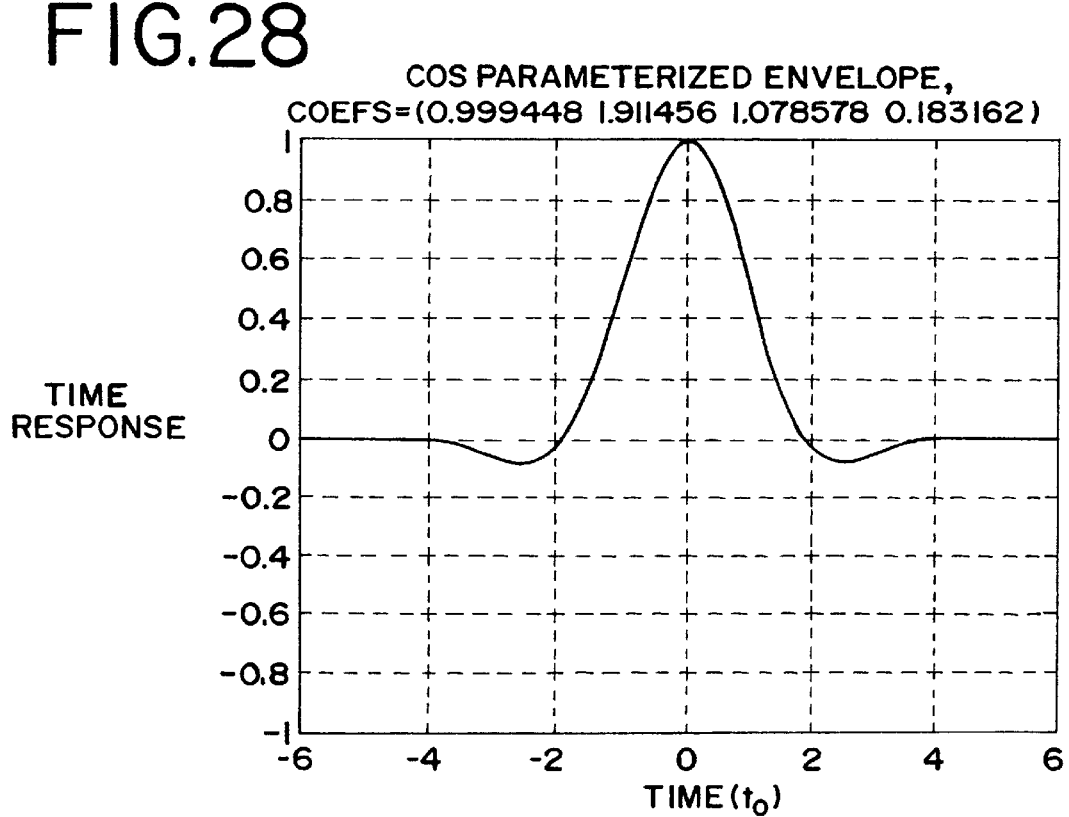
FIGS. 28 and 29 are time and frequency domain graphs of a broadband pulse, respectively.
Figure 29:
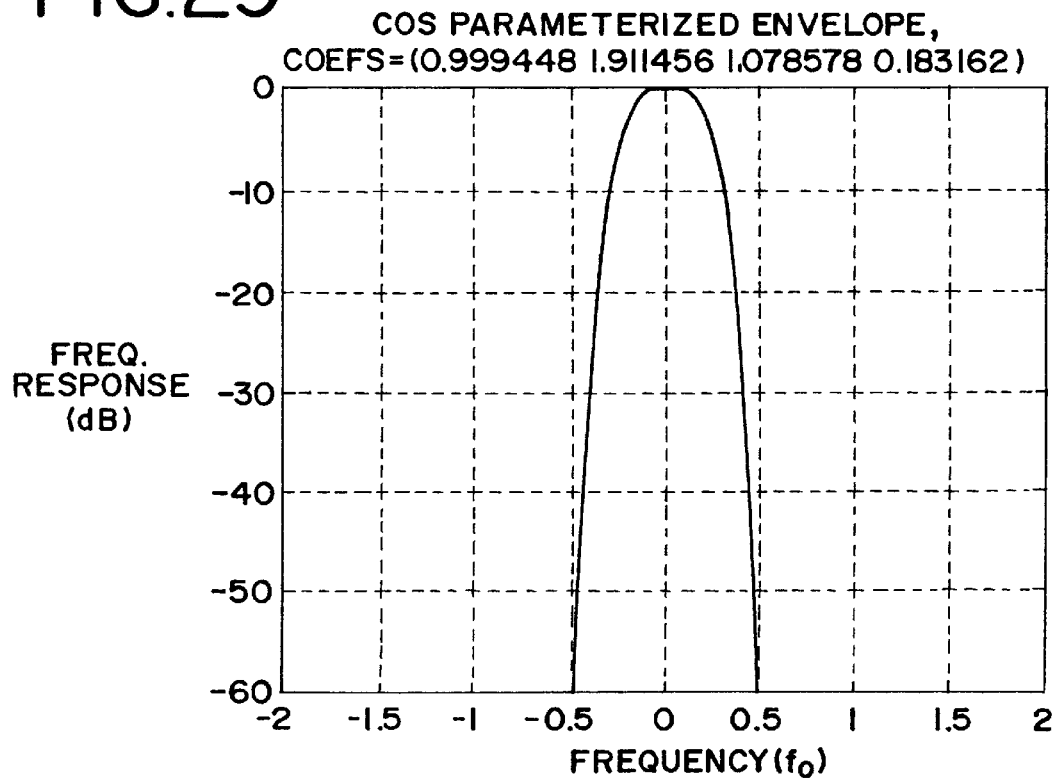

FIGS. 24 and 25 show time and frequency domain plots, respectively, of a COS parameterized Hanning envelope generated with the following values of the coefficients $a_k$: 0.5, 0.5, 0, 0. FIGS. 26 and 27 show time and frequency domain plots, respectively, of a COS parameterized Hamming envelope generated with the following values of $a_k$: 0.54, 0.46, 0, 0. FIGS. 28 and 29 show time and frequency domain plots, respectively, of a COS parameterized broad band pulse envelope generated with the following values of $a_k$: 0.999448, 1.911456, 1.078578, 0.183162.

d. Single-Channel Modes of Operation

Figure 30:
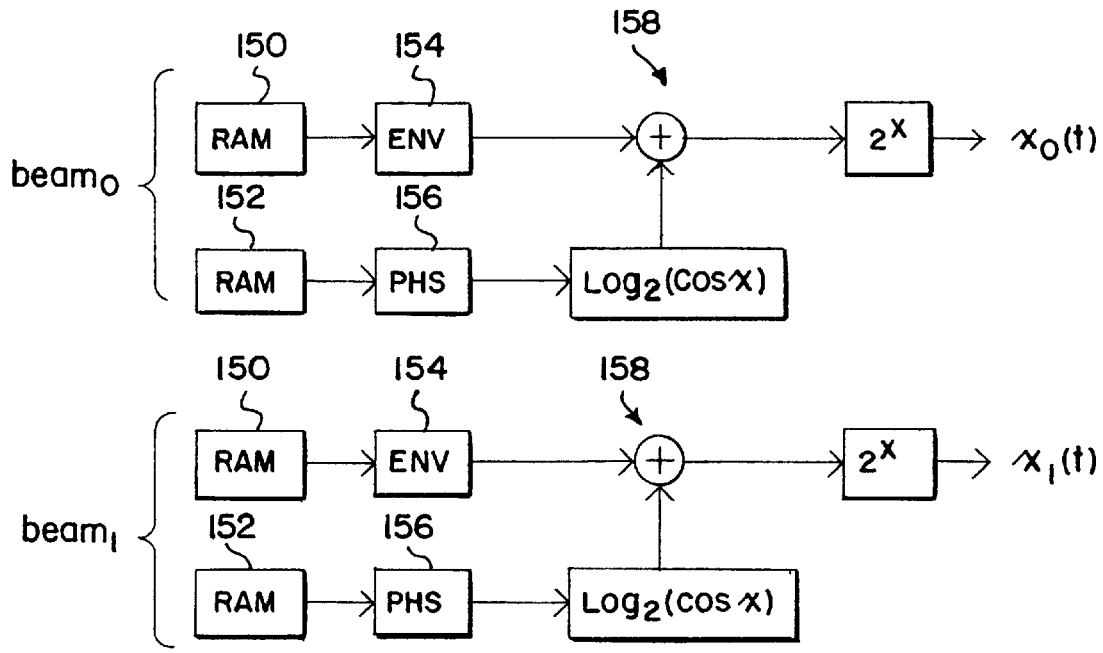
FIG. 30 is a block diagram of the transmitters 102 configured in a single-channel mode.

In one single-channel mode of operation, the transmitter 102 assigns a single transmit waveform generator 120 to each beam channel, and each beam channel is applied to a single transducer element via a single transducer channel. FIG. 30 provides a block diagram for this mode of operation, using the elements of FIG. 4. In one example, the transmit waveforms $X_0(t)$, $X_1(t)$ for transducer channels 0 and 1 are both pulses with Gaussian envelopes as described above.

e. Multi-Channel Modes of Operation

In multi-channel modes of operation, the transmitter assigns multiple transmit waveform generators 120 to each active transducer channel. For example, the transmit waveform $X_0(t)$ for channel 0 may take the form of a modulated sinc function. In one embodiment, $X_0(t)$ takes the form $$X_0(t) = \frac{\sin(\pi B t)}{(\pi B t)} \cdot \cos(2\pi f_o t).$$

The logarithm (base 2) of $X_0(t)$ is therefore expressed as follows:

$$\log_2(X_0(t)) = \log_2(\sin(\pi B t)) + \log_2(\cos(2\pi f_o t)) - \log_2(\pi B t).$$

Figure 31:
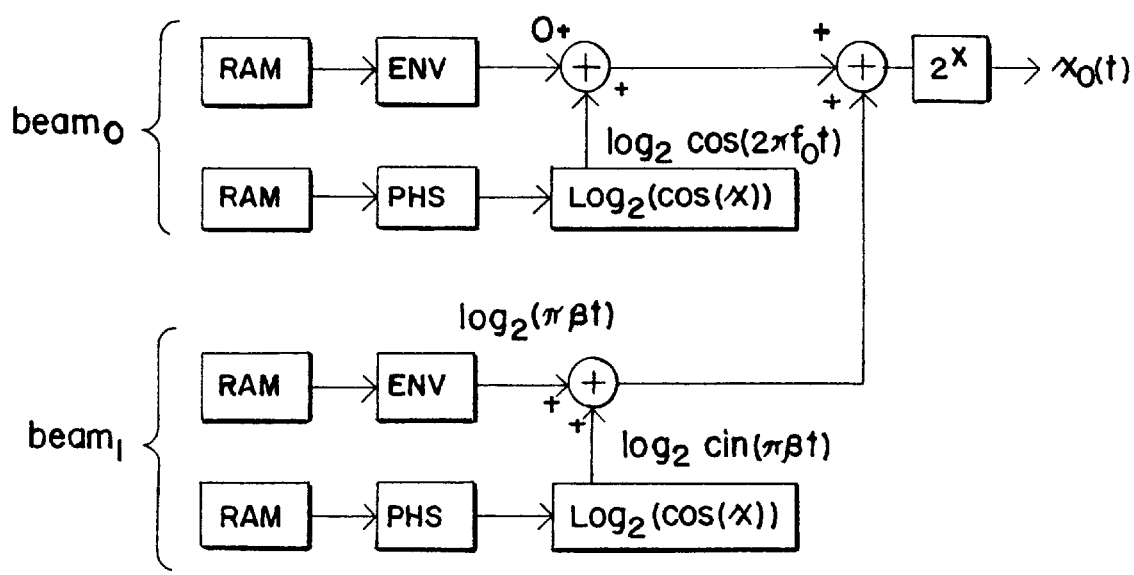
FIGS. 31 and 32 are block diagrams of the transmitters 102 configured in a multi-channel mode.

This embodiment may be implemented by combining two beams as shown in FIG. 31.

This is an example of multi-channel operation in which two transmit waveforms (each generated by a separate generator 120) overlap in time. That is, the generators 120 operate during the same time segment, and the transmit waveform at any time during the segment is obtained by combining transmit signals from two or more beam channels.

Figure 32:
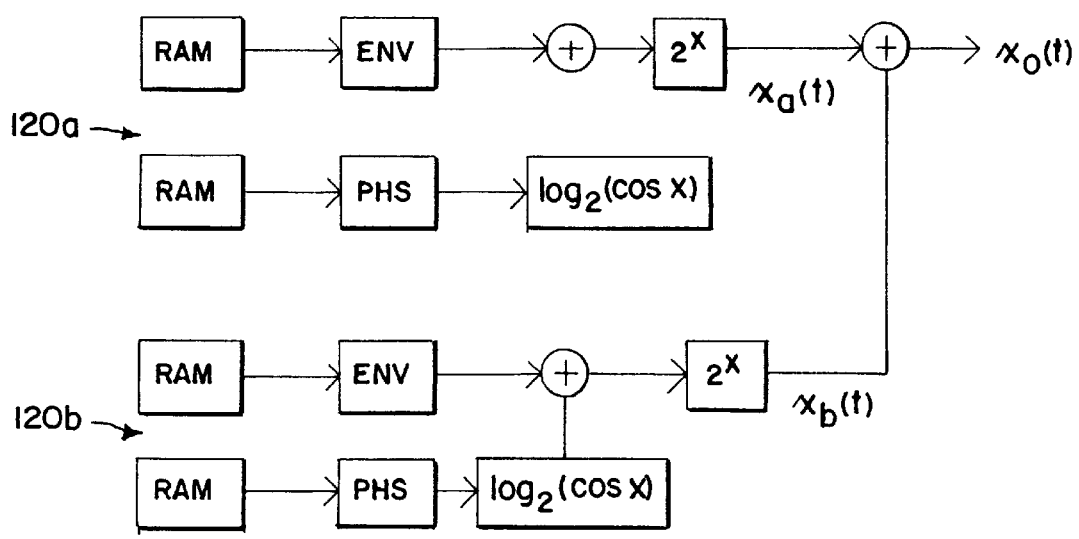
Figure 33:
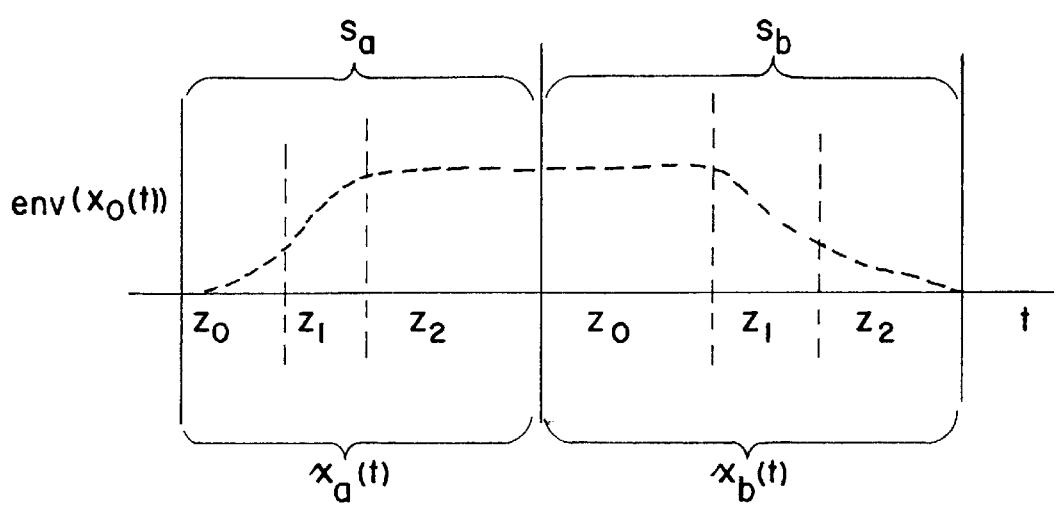
FIG. 33 is a plot of a waveform envelope produced by the system of FIG. 32.

In another multi-channel mode of operation, two or more generators 120 operate during consecutive, non-overlapping time segments to generate a longer transmit waveform. This embodiment is shown in block diagram form in FIG. 32, and the resulting transmit waveform envelope is shown in FIG. 33. Note that only the first generator 120a associated with a first beam channel operates during a first time segment Sa, and only the second generator 120*b* associated with a second beam channel operates during the second time segment Sb. In this example, the RAMs 150, 152 each hold only three zones of parameters, but the overall transmit waveform has six separate zones: three zones generated by the generator 120*a* and three zones generated by the generator 120*b*.

Figure 34:
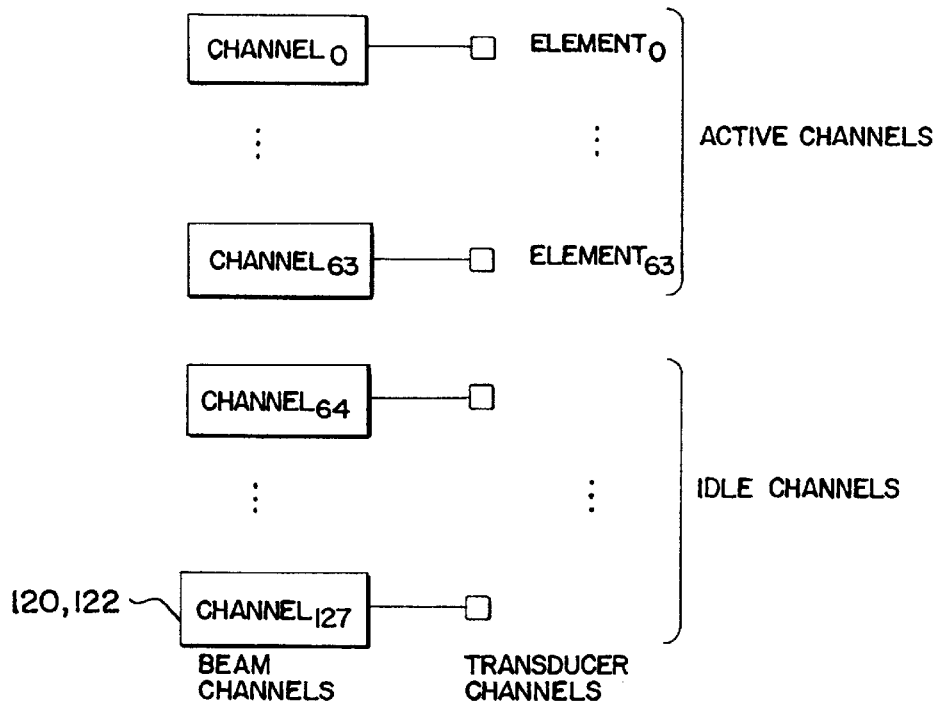

FIGS. 34–37 illustrate several modes of operation for the embodiment of FIG. 3, which for purposes of discussion is assumed to have 128 beam channels and 128 transducer channels. In this example, the outputs of the beam summer 122 will be referred to as respective beam channels, and the outputs of the channel summer 124 will be referred to as transducer channels. In the mode of FIG. 34, beam channels 0–63 are used to drive transducer elements 0–63 of a 64-element transducer, and beam channels 64–127 are idle. This is an example of single-channel operation.

Figure 35:
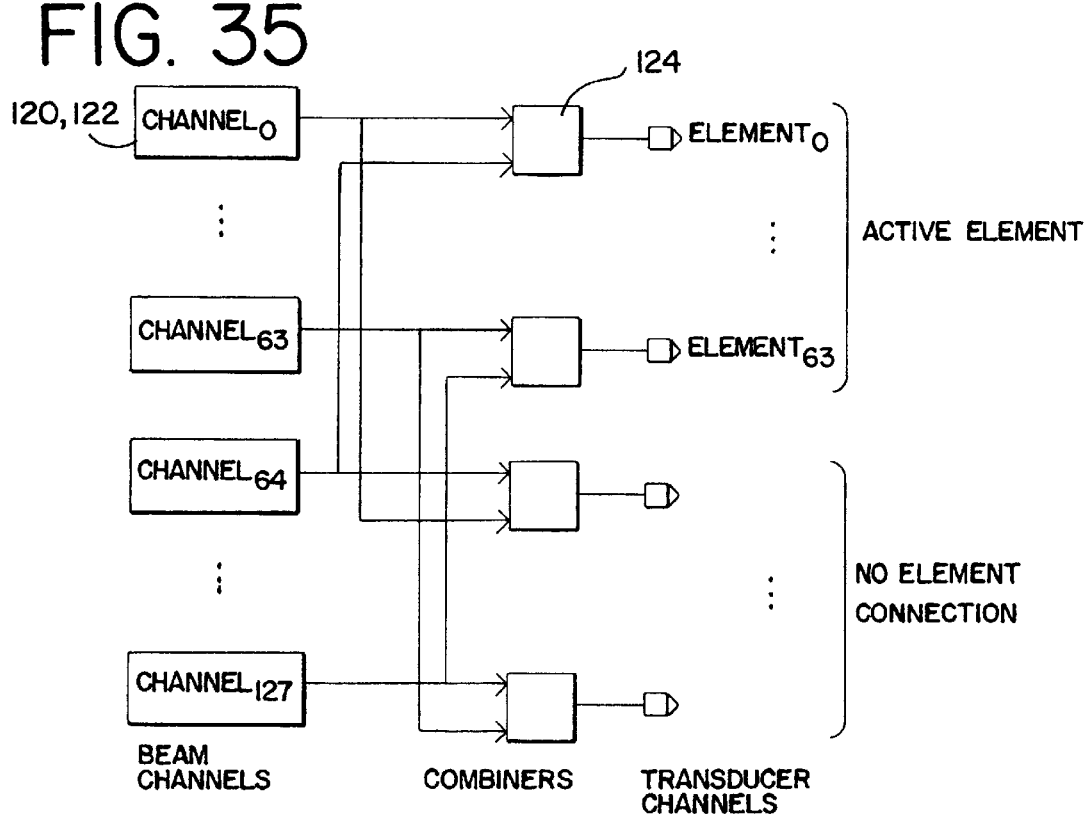

In the mode of FIG. 35, beam channels n and (n+64) are combined to drive transducer element n via transducer channel n ($0 \leq n \leq 63$). This is an example of multi-channel operation.

FIGS. 36 and 37 provide two examples of multi-channel operation for the case where 128 beam channels are used with a 128-element transducer. In FIG. 36, only elements 0–63 are active, and each element n is coupled with two beam channels: n and (n+64). In FIG. 37, only elements 64–127 are active, and each element (n+64) is coupled with two beam channels: n and (n+64). Any contiguous block of 64 elements can be driven (simultaneously) by two beam channels per element.

The channel combiners 124 of FIGS. 35–37 may combine the respective beam channel signals in many ways, including by adding, multiplying or dividing the signals on the respective beam channels.

Thus, a single-channel waveform is determined as a function of the processing capability of a single beam channel, and a multi-channel waveform is determined as a function of the processing capability of two or more beam channels. The embodiments of FIGS. 35–37 provide the advantage that the processing power of beam channels that would otherwise be idle is used to form more complex or longer transmit waveforms on the active transducer channels.

Of course, it should be understood that many changes and modifications can be made to the preferred embodiments described above. For example, the parametric waveform generation techniques described above can be implemented with multipliers rather than accumulators, and the channel summing and beam summing techniques described above can be used with other sources of ultrasonic transmit waveforms. The term "source" as used in this context is intended broadly to encompass any source of ultrasonic transmit waveforms, including those generated directly from memory, and those generated by modulating a stored or interpolated envelope using signal processing techniques, for example.

In an alternative embodiment, the ultrasonic transmit waveform is calculated in real time from a set of parameters that define the waveform directly, rather than defining the waveform as an envelope function that is modulated by a modulation function. Orthogonal functions such as Walsh functions and Hermite functions are examples of functions that may be used.

As used herein, the term "ultrasonic transmit waveform" is intended to refer to an RF frequency ultrasonic waveform that is applied to a transducer, at any stage in the signal path between the output of the transmit waveform generator 120 and the input to the transducer 106. The term "transmit waveform" is used to refer either to a piece or a zone of a total pulse, or the entire pulse.

The term "combiner" is intended broadly to include summers, multipliers, lookup tables and the like, whether operating in parallel or in time-interleaved fashion.

The term "calculate" is intended to include calculation in both the log domain and the linear domain, but to exclude signal processing techniques operating on sampled baseband envelopes.

The term "set" is used broadly to encompass one or more, and the term "accumulator" is used broadly to encompass adders. The term "logarithm" or "log" is intended to encompass logarithms in any base.

The foregoing detailed description has discussed only a few of the many forms that this invention can take. For this reason, this detailed description is intended by way of illustration and not limitation. It is only the following claims, including all equivalents, that are intended to define the scope of this invention.

What is claimed is:

1. A transmit waveform source for a medical ultrasound imaging system comprising a plurality of transducer channels, said transmit waveform source comprising:
   a plurality of transmit waveform generators, each operative to generate at least one respective transmit waveform;
   a plurality of combiners, each combiner comprising a plurality of inputs coupled with respective ones of the generators and an output;
   a multiplexer comprising a plurality of inputs coupled to respective ones of the combiners and a plurality of outputs coupled to respective ones of the transducer channels.

2. The invention of claim 1 wherein the multiplexer in a first state connects respective generators to a set of n transducer channels and in a second state connects respective generators to a reduced set of m transducer channels, where m<n.

3. The invention of claim 1 wherein the combiner comprises a summer.

4. The invention of claim 1 wherein the combiners comprises a plurality of gates, each gate operative to selectively gate the respective input on and off.

5. The invention of claim 1 wherein the combiner comprises a multiplier.

6. In a medical ultrasound imaging system, a method for generating transmit pulse waveforms comprising:
   (a) providing a set of transmitters comprising n transducer channels, each transducer channel adapted for connection to a respective transducer element; and n beam channels, each beam channel comprising a respective set of transmit waveform generators;
   (b) generating first multi-level transmit pulse waveforms on the n transducer channels with said n beam channels in a first mode of operation, wherein each of the beam channels is associated with a separate respective one of the transducer channels; and
   (c) generating second multi-level transmit pulse waveforms on a subset of the n transducer channels with said beam channels in a second mode of operation, wherein multiple ones of the beam channels contribute to each of the second transmit waveforms.

7. The method of claim 6 wherein each first transmit waveform is characterized by a respective Gaussian envelope, and wherein each second transmit waveform is characterized by a respective non-Gaussian envelope.

8. The method of claim 6 wherein the subset includes n/2 transducer channels.

9. The method of claim 6 wherein the subset includes n/4 transducer channels.

10. The method of claim 6 wherein each second transmit waveform is a function of multiple segments, each segment generated by a respective beam channel.

11. The method of claim 10 wherein at least two of the segments of one of the second transmit waveforms overlap in time.

12. The method of claim 10 wherein at least two of the segments of one of the second transmit waveforms do not overlap in time.

13. In a medical ultrasound imaging system, a method for generating transmit waveforms comprising:
   (a) providing a set of transmitters comprising n transducer channels, each transducer channel adapted for connection to a respective transducer element; and n beam channels, each beam channel comprising a respective set of transmit waveform generators;
   (b) generating first transmit waveforms on the n transducer channels with said n beam channels in a first mode of operation, wherein each of the beam channels is associated with a separate respective one of the transducer channels; and
   (c) generating second transmit waveforms on a subset of the n transducer channels with said beam channels in a second mode of operation, wherein multiple ones of the beam channels contribute to each of the second transmit waveforms.

14. The method of claim 13 wherein each first transmit waveform is characterized by a respective Gaussian envelope, and wherein each second transmit waveform is characterized by a respective non-Gaussian envelope.

15. The method of claim 13 wherein the subset includes n/2 transducer channels.

16. The method of claim 13 wherein the subset includes n/4 transducer channels.

17. The method of claim 13 wherein each second transmit waveform is a function of multiple segments, each segment generated by a respective transmit beam channel.

18. The method of claim 17 wherein at least two of the segments of one of the second transmit waveforms overlap in time.

19. The method of claim 17 wherein at least two of the segments of one of the second transmit waveforms do not overlap in time.

20. In a medical ultrasound imaging system, a method for allocating transmit waveform processing, said method comprising:
   (a) providing a set of transmitters comprising n transducer channels, each transducer channel adapted for connection to a respective transducer element; and n beam channels, each beam channel comprising a respective set of transmit waveform generators;
   (b) trading off (1) the number of beam channels generating multi-level pulse waveforms for each active transducer channel with (2) the number of transducer channels that are simultaneously active.

21. In a medical ultrasound imaging system, a method for allocating transmit waveform processing, said method comprising:
   (a) providing a set of transmitters comprising n transducer channels, each transducer channel adapted for connection to a respective transducer element, and n signal generators, each signal generator associated with a separate respective transducer channel in a single-channel mode of operation; and
   (b) trading off (1) the number of signal generators generating multi-level pulse waveforms for each active transducer channel with (2) the number of transducer channels that are simultaneously active.

* * * * *